US012784964B2

(12) United States Patent
Taniguchi et al.

(10) Patent No.: US 12,784,964 B2
(45) Date of Patent: Nov. 3, 2026

(54) COIL COMPONENT

(71) Applicant: Murata Manufacturing Co., Ltd., Kyoto-fu (JP)

(72) Inventors: Masaya Taniguchi, Nagaokakyo (JP); Yuki Kanbe, Nagaokakyo (JP); Osamu Monguchi, Nagaokakyo (JP); Kazuto Shibuya, Nagaokakyo (JP); Shinya Hirai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 925 days.

(21) Appl. No.: 17/932,997

(22) Filed: Sep. 16, 2022

(65) Prior Publication Data

US 2023/0091835 A1 Mar. 23, 2023

(30) Foreign Application Priority Data

Sep. 21, 2021 (JP) ................................ 2021-153489

(51) Int. Cl.
*H01F 27/28* (2006.01)
*H01F 5/00* (2006.01)

(52) U.S. Cl.
CPC ..... *H01F 27/2885* (2013.01); *H01F 27/2823* (2013.01); *H01F 2005/006* (2013.01)

(58) Field of Classification Search
CPC ............ H01F 27/2885; H01F 27/2823; H01F 2005/006; H01F 17/045; H01F 27/022; H01F 27/292
USPC .................................................. 336/65–234
See application file for complete search history.

(56) References Cited

U.S. PATENT DOCUMENTS

2006/0066498 A1* 3/2006 Abe ........................ H01Q 7/08 343/788

FOREIGN PATENT DOCUMENTS

| | | | | |
|---|---|---|---|---|
| JP | H02-224306 | A | | 9/1990 |
| JP | H02120812 | U | * | 9/1990 |
| JP | H10-172832 | A | | 6/1998 |
| JP | 3204112 | B2 | | 9/2001 |
| JP | 2002-353042 | A | | 12/2002 |
| JP | 2003-086438 | A | | 3/2003 |
| JP | 2004-193331 | A | | 7/2004 |
| JP | 2005-251933 | A | | 9/2005 |
| JP | 2006-129435 | A | | 5/2006 |
| JP | 2011-171544 | A | | 9/2011 |

* cited by examiner

*Primary Examiner* — Tuyen T Nguyen
(74) *Attorney, Agent, or Firm* — Studebaker Brackett PLLC

(57) ABSTRACT

A coil component includes a core including a core body, first and second flanges at first and second ends, respectively, of the body; first and second outer electrodes on the first and second flanges, respectively; and a wire wound around the body and electrically connected to the electrodes. The body has a peripheral face extending in a peripheral direction about an axis of the body. In a section containing the axis, a distance between at least a part of the face and the axis is smaller on a side near a center of the body in a direction of the axis than on a side near each of the first and second ends while a distance between the wire and the axis is smaller on the side near the center in the direction of the axis than on the side near each of the first and second ends.

20 Claims, 13 Drawing Sheets

COIL COMPONENT

CROSS-REFERENCE TO RELATED APPLICATION

This application claims benefit of priority to Japanese Patent Application No. 2021-153489, filed Sep. 21, 2021, the entire content of which is incorporated herein by reference.

BACKGROUND

Technical Field

The present disclosure relates to a coil component.

Background Art

A related-art coil component is disclosed by Japanese Registered Utility Model No. 3204112. The coil component includes a core, outer electrodes, and a wire. The core includes a core body and a pair of flanges provided at two respective ends of the core body. The outer electrodes are provided on the pair of respective flanges. The wire is wound around the core body and has two ends electrically connected to the respective outer electrodes.

SUMMARY

In known coil components such as the one described above, the core body has a constant thickness in a direction orthogonal to two end faces of the core body. Therefore, the wire wound around the core body may interfere with the magnetic flux. Consequently, an eddy-current loss due to the interference with the magnetic flux may occur, leading to a reduction in the Q-value.

The present disclosure provides a coil component exhibiting an increased Q-value.

Accordingly, a coil component according to an aspect of the present disclosure includes a core including a core body, a first flange provided at a first end of the core body, and a second flange provided at a second end of the core body; a first outer electrode provided on the first flange; a second outer electrode provided on the second flange; and a wire wound around the core body and electrically connected to the first outer electrode and to the second outer electrode. The core body has a peripheral face extending in a peripheral direction about an axis of the core body. In a section containing the axis of the core body, a distance between at least a part of the peripheral face and the axis is smaller on a side near a center of the core body in a direction of the axis than on a side near each of the first end and the second end of the core body while a distance between the wire and the axis is smaller on the side near the center of the core body in the direction of the axis than on the side near each of the first end and the second end of the core body.

Herein, the axis of the core body refers to a straight line that extends in a section perpendicular to a first direction orthogonal to an end face at the first end of the core body and to an end face at the second end of the core body. The straight line passes through the center of a section of the core body where the sectional area of the core body is smallest. The straight line is parallel to the first direction.

The center of the core body in the direction of the axis refers to the center between the first end and the second end in the direction of the axis of the core body. The side near the center of the core body refers to any position of the core body that is closer to the center.

The relationship in which the distance on the side near the center of the core body is smaller than the distance on the side near each of the first end and the second end of the core body only needs to be satisfied in at least one of sections that contain the axis of the core body.

In the above embodiment, in a section containing the axis of the core body, since the distance between the peripheral face and the axis is smaller on the side near the center of the core body than on the side near each of the first end and the second end of the core body, the shape of the peripheral face of the core body conforms to the lines of magnetic flux. Consequently, the shape of the wire wound around the peripheral face of the core body conforms to the lines of magnetic flux. Such a configuration reduces the interference between the wire wound around the core body and the magnetic flux on the side near each of the first end and the second end of the core body. Consequently, the eddy-current loss due to the interference with the magnetic flux is reduced. Accordingly, the Q-value is increased.

Preferably, in one embodiment of the coil component, the peripheral face of the core body is formed of a plurality of faces arranged side by side in the peripheral direction about the axis of the core body. Also, a distance between at least one of the plurality of faces and the axis is smaller on the side near the center of the core body in the direction of the axis than on the side near each of the first end and the second end of the core body.

In the above embodiment, since the peripheral face of the core body is formed of a plurality of faces, the wire wound around the core body is stopped by the ridges formed at the edges of the faces. Therefore, the displacement of the wire is suppressed. Thus, the shape of the wire assuredly conforms to the lines of magnetic flux generated around the peripheral face of the core body. Consequently, the interference with the magnetic flux is assuredly reduced.

Preferably, in one embodiment of the coil component, the at least one face includes a first inclined portion a distance of which from the axis continuously decreases from the side near the first end toward the side near the center, and a second inclined portion a distance of which from the axis continuously decreases from the side near the second end toward the side near the center.

In the above embodiment, since at least one of the peripheral faces includes the first and second inclined portions, the shape of the peripheral face of the core body more assuredly conforms to the lines of magnetic flux. Consequently, the Q-value is further increased.

Preferably, in one embodiment of the coil component, the first inclined portion and the second inclined portion are each flat, and an inclination angle of each of the first inclined portion and the second inclined portion with respect to a straight line parallel to the axis is greater than 0° and smaller than or equal to 30° (i.e., from greater than 0° to 30°).

Herein, the inclination angle of each of the first and second inclined portions is defined to be 0° when the first or second inclined portion is parallel to the straight line parallel to the axis.

In the above embodiment, since the inclination angles of the first and second inclined portions are each greater than 0° and smaller than or equal to 30° (i.e., from greater than 0° to 30°), the shape of the peripheral face of the core body much more assuredly conforms to the lines of magnetic flux. Consequently, the Q-value is much further increased.

Preferably, in one embodiment of the coil component, the at least one face includes the first inclined portion, the second inclined portion, and a horizontal portion, the horizontal portion being located between and connected to the first inclined portion and the second inclined portion, the horizontal portion being parallel to the axis. Also, the wire is wound by one or more turns on each of the first inclined portion and the second inclined portion and by two or more turns on the horizontal portion.

According to the above embodiment, the shape of the wire wound around the peripheral face of the core body conforms to the lines of magnetic flux. Consequently, the Q-value is much further increased.

Preferably, in one embodiment of the coil component, all of the faces each include the first inclined portion, the second inclined portion, and the horizontal portion.

According to the above embodiment, the shape of the wire wound around the peripheral face of the core body conforms to the lines of magnetic flux. Consequently, the Q-value is much further increased.

Preferably, in one embodiment of the coil component, all of the faces are each formed of the first inclined portion and the second inclined portion.

According to the above embodiment, the shape of the peripheral face of the core body conforms to the lines of magnetic flux. Therefore, the shape of the wire wound around the peripheral face of the core body conforms to the lines of magnetic flux. Consequently, the Q-value is much further increased.

Preferably, in one embodiment of the coil component, an inclination angle of the first inclined portion of at least one of the faces with respect to a straight line parallel to the axis is different from an inclination angle of the first inclined portion of an other of the faces with respect to a straight line parallel to the axis. Also, an inclination angle of the second inclined portion of at least one of the faces with respect to a straight line parallel to the axis is different from an inclination angle of the second inclined portion of an other of the faces with respect to a straight line parallel to the axis.

In the above embodiment, the shape of the peripheral face of the core body is adjusted to conform to the lines of magnetic flux. Therefore, the shape of the wire wound around the peripheral face of the core body is adjusted to conform to the lines of magnetic flux. Consequently, the Q-value is much further increased.

Preferably, in one embodiment of the coil component, the first flange and the second flange each has an inner end face facing toward the core body; an outer end face facing away from the inner end face; a bottom face connecting the inner end face and the outer end face to each other and that is to face toward a mounting substrate on which the coil component is to be mounted; a top face facing away from the bottom face; and two lateral faces each connecting the inner end face and the outer end face to each other and connecting the bottom face and the top face to each other. The coil component further includes a resin member that covers the first flange; the second flange; the core body; and the wire on a side near the top face in a height direction defined from the bottom face of the first flange toward the top face of the first flange. Also, seen in a direction orthogonal to the lateral face of the first flange, a distance from a lower edge of the resin member in an area over the core body and the wire to an extension plane extended from the bottom face of the first flange is smaller on the side near the center of the core body than on the side near each of the first end and the second end of the core body.

In the above embodiment, seen in the direction orthogonal to the lateral face of the first flange, the area of contact between the resin member and the wire is smaller than in a case where the lower edge of the resin member is parallel to the axis. Therefore, the stray capacitance between the resin member and the wire is reduced. Consequently, the Q-value is increased.

Preferably, in one embodiment of the coil component, seen in the direction orthogonal to the lateral face of the first flange, the lower edge of the resin member includes a first oblique side a distance of which from the extension plane continuously decreases from the side near the first end toward the side near the center; and a second oblique side a distance of which from the extension plane continuously decreases from the side near the second end toward the side near the center.

In the above embodiment, since the lower edge of the resin member includes the first and second oblique sides, the area of contact between the resin member and the wire is further reduced. Therefore, the stray capacitance between the resin member and the wire is further reduced. Consequently, the Q-value is further increased.

Preferably, in one embodiment of the coil component, the peripheral face of the core body includes a bottom face that is to face toward a mounting substrate on which the coil component is to be mounted; and a top face that faces away from the bottom face. The top face of the core body includes a first inclined portion a distance of which from the axis continuously decreases from the side near the first end toward the side near the center; and a second inclined portion a distance of which from the axis continuously decreases from the side near the second end toward the side near the center. Also, seen in the direction orthogonal to the lateral face of the first flange, an inclination angle of the first oblique side with respect to a straight line parallel to the axis is equal to or greater than an inclination angle of the first inclined portion with respect to a straight line parallel to the axis while an inclination angle of the second oblique side with respect to a straight line parallel to the axis is equal to or greater than an inclination angle of the second inclined portion with respect to a straight line parallel to the axis.

Herein, the inclination angle of each of the first and second oblique sides is defined to be 0° when the first or second oblique side is parallel to the straight line parallel to the axis.

In the above embodiment, since the inclination angle of the first oblique side is equal to or greater than the inclination angle of the first inclined portion while the inclination angle of the second oblique side is equal to or greater than the inclination angle of the second inclined portion, the area of contact between the resin member and the wire is much further reduced. Therefore, the stray capacitance between the resin member and the wire is much further reduced. Consequently, the Q-value is much further increased.

Preferably, in one embodiment of the coil component, seen in a direction orthogonal to the top face of the first flange and in a direction orthogonal to the axis, a width of the resin member in the direction orthogonal to the axis is smaller on the side near the center of the core body than on the side near each of the first end and the second end of the core body.

In the above embodiment, seen in the direction orthogonal to the top face of the first flange, the resin member is depressed on the side near the center of the core body. Thus, the increase in the width of the coil component that is caused by providing the resin member is suppressed.

Preferably, in one embodiment of the coil component, the core body has symmetry with respect to a plane extending orthogonally to the axis and passing through the center of the core body.

Herein, the plane passing through the center of the core body refers to not only a plane passing through the exact center of the core body but also a plane passing through an area that is within a displacement from the center toward each of the first end and the second end by 10% of the distance between the center and a corresponding one of the first end and the second end.

In the above embodiment, since the core body has plane symmetry, the shape of the peripheral face of the core body conforms to the lines of magnetic flux. Consequently, the Q-value is much further increased.

The coil component according to the above aspect of the present disclosure exhibits an increased Q-value.

DETAILED DESCRIPTION

Embodiments of the coil component according to an aspect of the present disclosure will now be described in detail with reference to the drawings. Some of the drawings are schematic or not to scale.

First Embodiment

Outline

Figure 1:
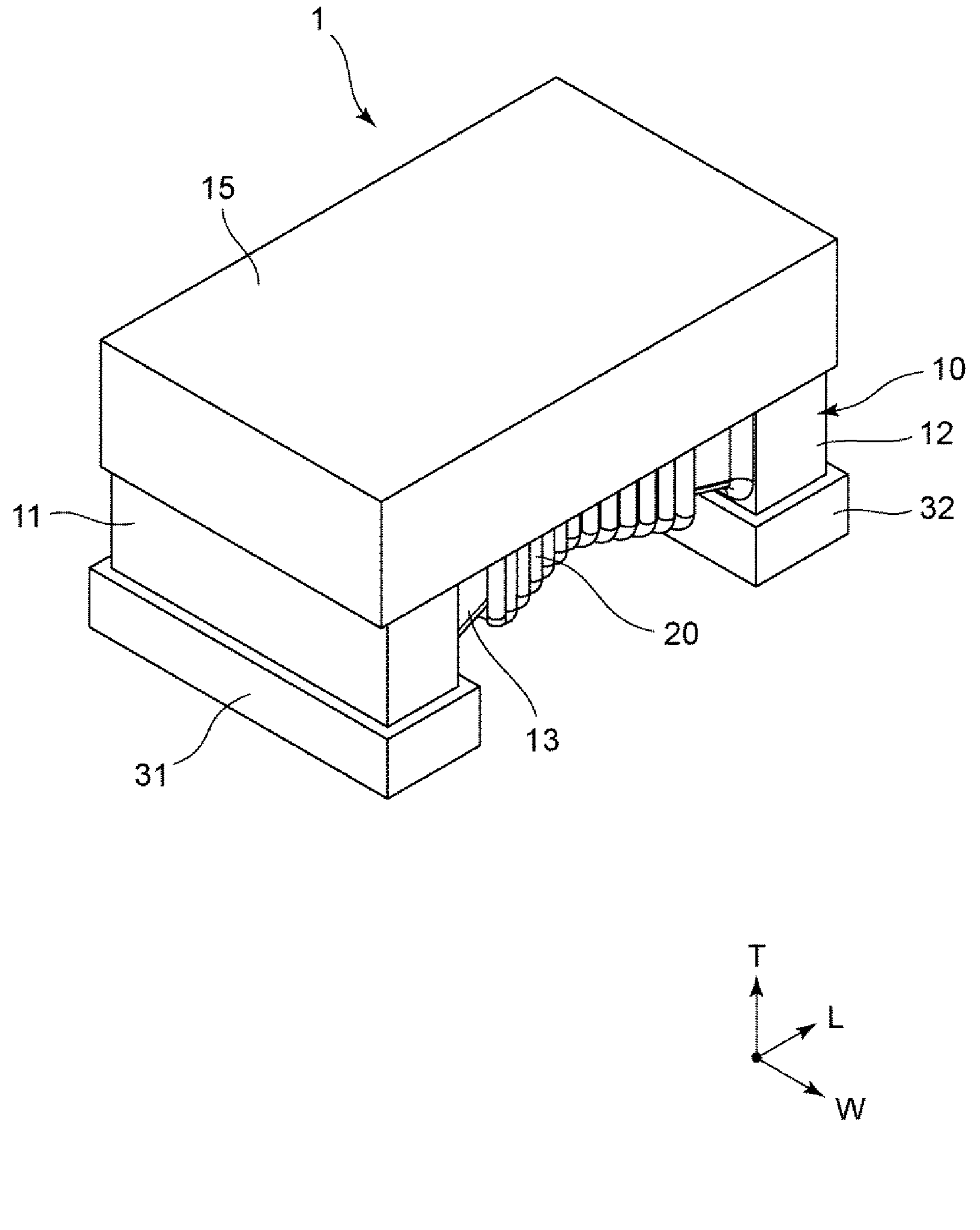
FIG. 1 is a top perspective view of a first embodiment of the coil component.
Figure 2:
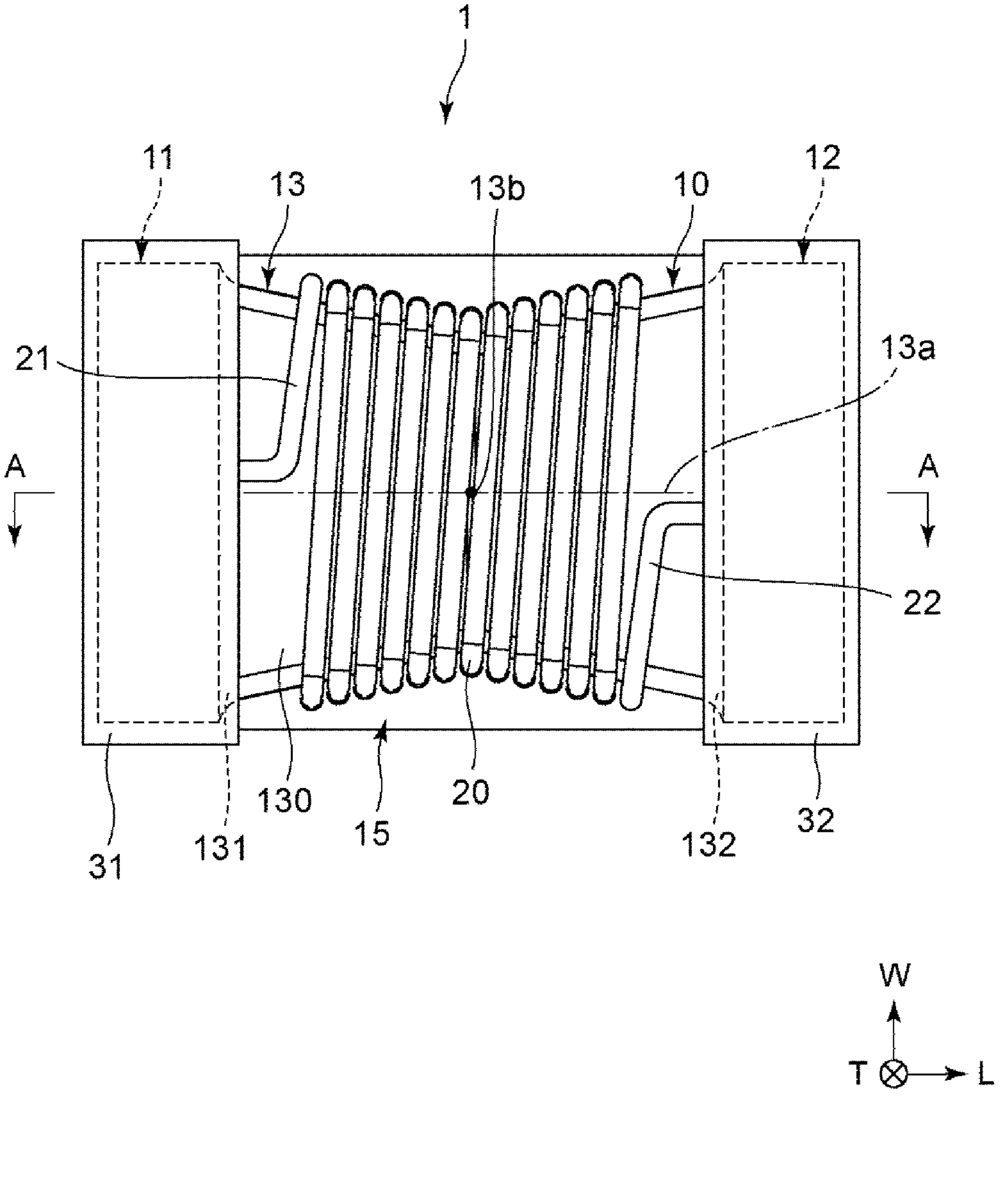
FIG. 2 is a bottom view of the coil component.
Figure 3:
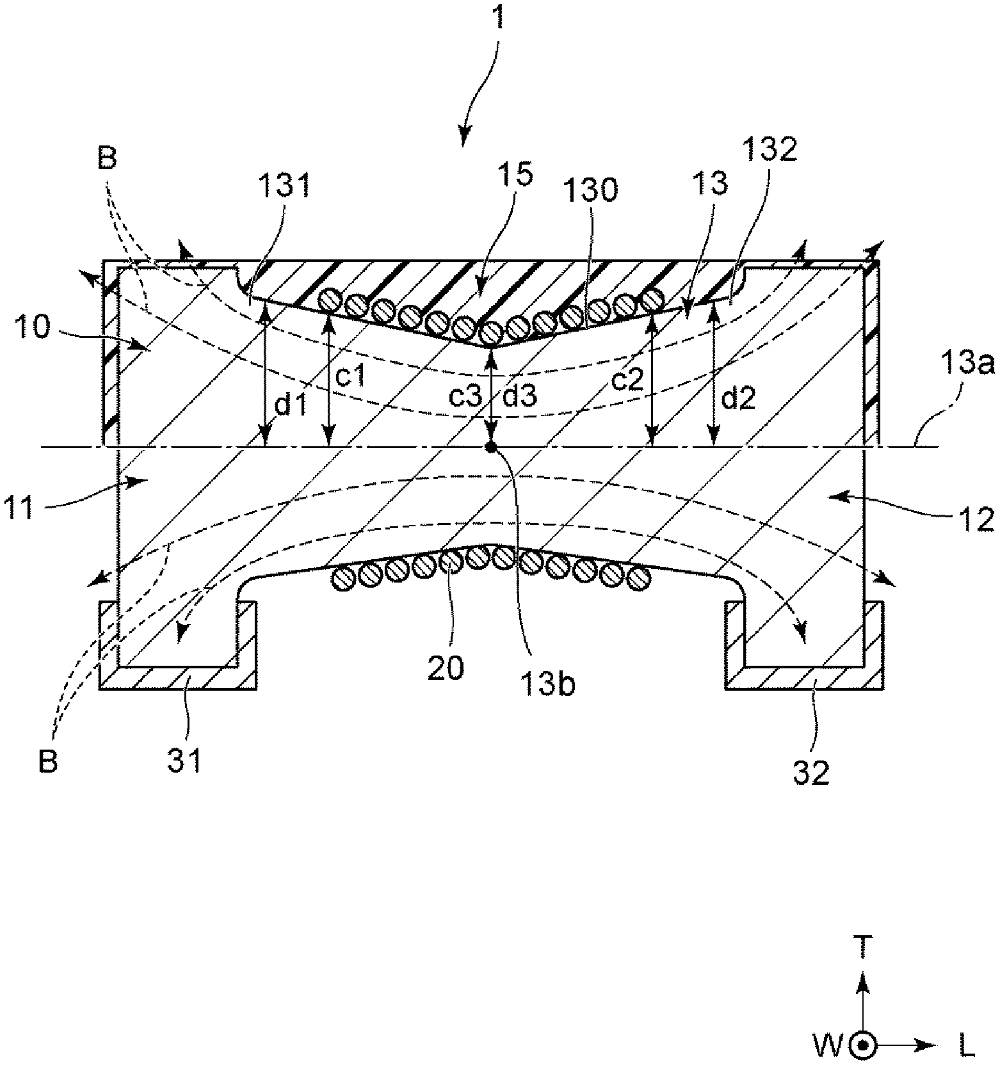
FIG. 3 illustrates a section taken along line A-A given in FIG. 2.

FIG. 1 is a top perspective view of a first embodiment of the coil component. FIG. 2 is a bottom view of the coil component. FIG. 3 illustrates a section taken along line A-A given in FIG. 2. As illustrated in FIGS. 1, 2, and 3, a coil component 1 includes a core 10, a first outer electrode 31 and a second outer electrode 32, a wire 20, and a resin member 15. The first outer electrode 31 and the second outer electrode 32 are provided on the core 10. The wire 20 is wound around the core 10 and is electrically connected to the first outer electrode 31 and to the second outer electrode 32. The resin member 15 is attached to the core 10.

The core 10 includes a core body 13, a first flange 11, and a second flange 12. The core body 13 has a shape extending in one given direction in which a first end 131 and a second end 132 are defined. The wire 20 is wound around the core body 13. The first flange 11 is provided at the first end 131 and projects from the core body 13 in a direction orthogonal to the given direction. The second flange 12 is provided at the second end 132 and projects from the core body 13 in the direction orthogonal to the given direction. The given direction in which the core body 13 extends is also referred to as the direction of the axis, 13*a*, of the core body 13. The material for the core 10 is preferably a nonmagnetic substance such as alumina or resin, or may be a magnetic substance such as sintered ferrite or a cast body of resin containing magnetic powder.

Hereinafter, the bottom face of the core 10 is defined as a face to be mounted on a mounting substrate, and the face of the core 10 that faces away from the bottom face is defined as the top face of the core 10. The direction of the axis 13*a* of the core body 13 from the first flange 11 toward the second flange 12 is defined as the L-direction. The direction orthogonal to the L-direction in the bottom face of the core 10 is defined as the W-direction. The direction from the bottom face of the core 10 toward the top face of the core 10 is defined as the T-direction. The T-direction is orthogonal to the L-direction and to the W-direction. The W-, L-, and T-directions combined in that order form a right-handed system. The positive side in the T-direction is defined as the upper side, and the negative side in the T-direction is defined as the lower side. That is, the bottom face of the core 10 is located on the lower side in the vertical direction, and the top face of the core 10 is located on the upper side in the vertical direction. The L-direction is also referred to as the length direction of the core 10. The W-direction is also referred to as the width direction of the core 10. The T-direction is also referred to as the height direction of the core 10.

The first outer electrode 31 is provided at the bottom face of the first flange 11. The second outer electrode 32 is provided at the bottom face of the second flange 12. The first outer electrode 31 and the second outer electrode 32 each include an underlayer serving as a foundation, and a metal film provided over the underlayer. The underlayer is made from, for example, silver paste, which is dried and fired. The metal film is, for example, a film based on a nickel alloy and provided over the underlayer by electroplating or the like.

The wire 20 is a conductor made of metal such as copper and covered with an insulative film made of resin such as polyurethane or polyamide imide. The wire 20 is electrically connected at one end thereof to the first outer electrode 31 and at the other end thereof to the second outer electrode 32. The wire 20 and the first outer electrode 31 are connected to each other by a technique such as thermocompression bonding, brazing, or welding. The wire 20 includes a first extended portion 21 and a second extended portion 22. The first extended portion 21 is extended from a part of the wire 20 that is wound around the core body 13 to the first outer electrode 31. The second extended portion 22 is extended from the part of the wire 20 that is wound around the core body 31 to the second outer electrode 32.

Preferably, the first extended portion 21 and the second extended portion 22 seen from the bottom-face side of the core 10 are symmetrical to each other with respect to the center, 13*b*, of the core body 13 in the direction of the axis 13*a*. The center 13*b* of the core body 13 is the center point of the core body 13. In such a configuration, the first extended portion 21 and the second extended portion 22 have the same length. Therefore, the nonuniformity in the performance of the coil component 1 is reduced.

Preferably, the wire 20 on the core body 13 seen from the bottom-face side of the core 10 has symmetry with respect to the center 13*b* of the core body 13. In such a configuration, the wire 20 on the core body 13 has point symmetry. Therefore, the nonuniformity in the performance of the coil 20 is reduced.

The resin member 15 is attached to the top face of the core 10. Specifically, the resin member 15 covers the core 10 and the wire 20 in an area on the top-face side with respect to the axis 13*a*. That is, the area on the top-face side is not a hollow but is filled with the resin member 15. In other words, a recess defined by the peripheral face, 130, of the core body 13, the first flange 11, and the second flange 12 is filled with the resin member 15 on the top-face side with respect to the axis 13*a*.

The resin member 15 is to be held by a mounter when the coil component 1 is picked up by the mounter. The resin member 15 protects the wire 20 when the coil component 1 is picked up. The upper face of the resin member 15 is flat. Therefore, the mounter can stably hold the resin member 15. The resin member 15 is made of, for example, acrylic resin. The resin member 15 may extend up to a position on the bottom-face side with respect to the axis 13*a*.

The core body 13 has the peripheral face 130, which extends in the peripheral direction about the axis 13*a* of the core body 13. In a section containing the axis 13*a* of the core body 13, as illustrated in FIG. 3, the distance between the peripheral face 130 and the axis 13*a* is smaller on the side near the center 13*b* of the core body 13 than on the side near each of the first end 131 and the second end 132 of the core body 13 while the distance between the wire 20 and the axis 13*a* is smaller on the side near the center 13*b* of the core body 13 than on the side near each of the first end 131 and the second end 132 of the core body 13.

Specifically, on the top-face side of the peripheral face 130, the distance, d3, between the peripheral face 130 and the axis 13*a* at the center 13*b* of the core body 13 is smaller than the distance, d1, between the peripheral face 130 and the axis 13*a* at the first end 131 of the core body 13 and is smaller than the distance, d2, between the peripheral face 130 and the axis 13*a* at the second end 132 of the core body 13.

Furthermore, on the top-face side of the peripheral face 130, the distance, c3, between the wire 20 and the axis 13*a* at the center 13*b* of the core body 13 is smaller than the distance, c1, between the wire 20 and the axis 13*a* at the first end 131 of the core body 13 and is smaller than the distance, c2, between the wire 20 and the axis 13*a* at the second end 132 of the core body 13. The distance c1 is equal to the distance d1.

The above relationship on the top-face side of the peripheral face 130 also applies to the relationship on the bottom-face side of the peripheral face 130.

FIG. 3 illustrates a case where the above distance relationship is satisfied in an LT-section, which contains the axis 13*a* of the core body 13. However, the relationship in which the distance on the side near the center 13*b* of the core body 13 is smaller than the distance on the side near each of the first end 131 and the second end 132 of the core body 13 only needs to be satisfied in at least one of sections that contain the axis 13*a* of the core body 13 and in at least a part of the peripheral face 130.

In such a configuration, in a section containing the axis 13*a* of the core body 13, the distance between the peripheral face 130 and the axis 13*a* is smaller on the side near the center 13*b* of the core body 13 than on the side near each of the first end 131 and the second end 132 of the core body 13 while the distance between the wire 20 and the axis 13*a* is smaller on the side near the center 13*b* of the core body 13 than on the side near each of the first end 131 and the second end 132 of the core body 13. Therefore, the shape of the peripheral face 130 of the core body 13 conforms to the lines of magnetic flux. Consequently, the shape of the wire 20 wound around the peripheral face 130 of the core body 13 conforms to the lines of magnetic flux. In FIG. 3, the lines of magnetic flux are illustrated by dotted-line arrows B. Such a configuration reduces the interference between the wire 20 wound around the core body 13 and the magnetic flux on the side near each of the first end 131 and the second end 132 of the core body 13. Consequently, the eddy-current loss due to the interference with the magnetic flux is reduced. Accordingly, the Q-value is increased.

The Q-value is a characteristic value that determines the function exerted by frequency matching in the coil design. Considering the expression for deriving the Q-value ($Q=2\pi FL/[Rdc+Rac]$), the Q-value may be obtained by the following measures: the iron loss (Rac) may be reduced by increasing the perimeter of the wire, or the inductance value may be increased by increasing the perimeter of the core body (inductance value $L=k\mu N2S/W$, where S denotes the sectional area of the core body, and W denotes the width by which the wire is wound around the core body).

However, increasing the perimeter of the wire leads to a reduction in the inductance value because the width by which the wire is wound around the core body increases. On the other hand, increasing the perimeter of the core body leads to an increase in the copper loss because the length of the wire increases (copper loss $Rdc=\rho E/S$, where E denotes the length of the wire). There is a trade-off between the two measures. Therefore, it is difficult to increase the Q-value while maintaining the inductance value. Moreover, increasing the perimeter of the wire or the core may limit the size of the coil component.

The present embodiment achieves a reduction in the interference between the wire 20 and the magnetic flux by employing the above configuration, thereby achieving a reduction in the eddy-current loss due to the interference with the magnetic flux and thus a reduction in loss components regarding the wire 20. The iron loss (Rac) attributed to the loss components is inversely proportional to the Q-value. Therefore, reducing the iron loss increases the Q-value. Furthermore, the reduction in the interference of the magnetic flux with the wire 20 suppresses the reduction in the inductance value. Since the increase in the Q-value is achieved while the inductance value is maintained with no increase in the perimeters of the wire 20 and the core body 13, there is no chance that the size of the coil component 1 is limited.

[Preferable Configuration of Core]

Figure 4:
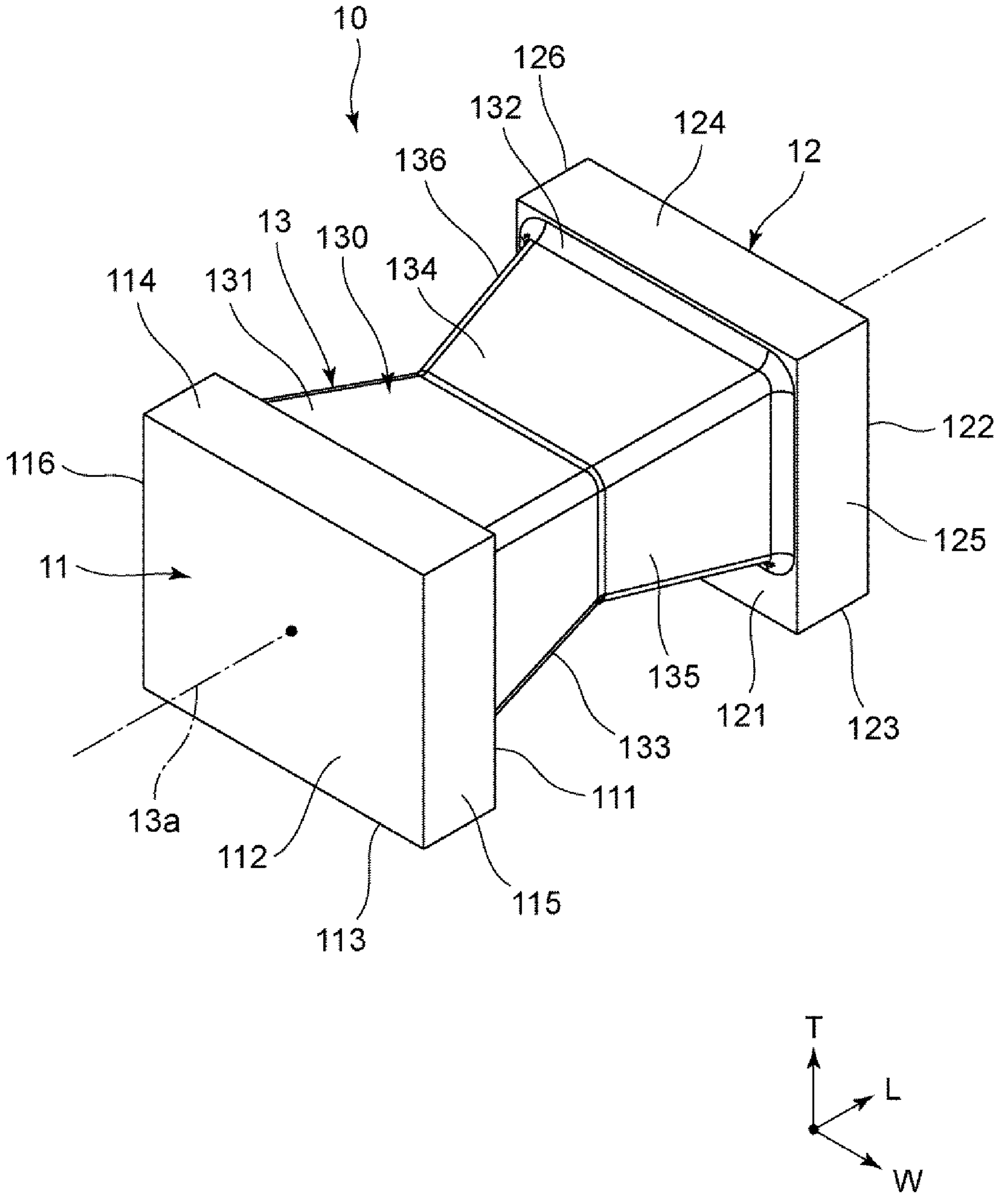
FIG. 4 is a top perspective view of a core.
Figure 5:
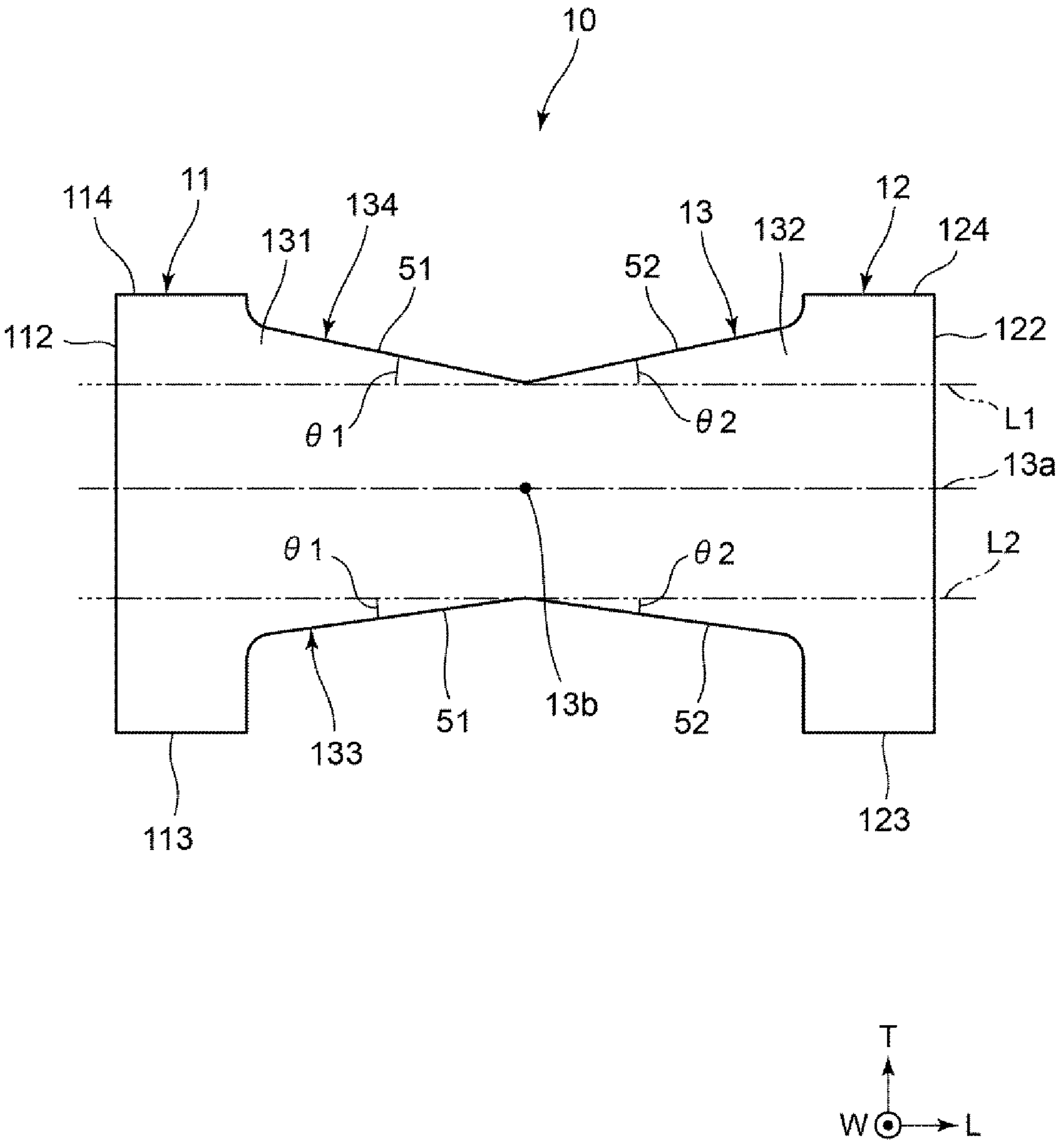
FIG. 5 illustrates an LT-section containing the axis of the core.
Figure 6:
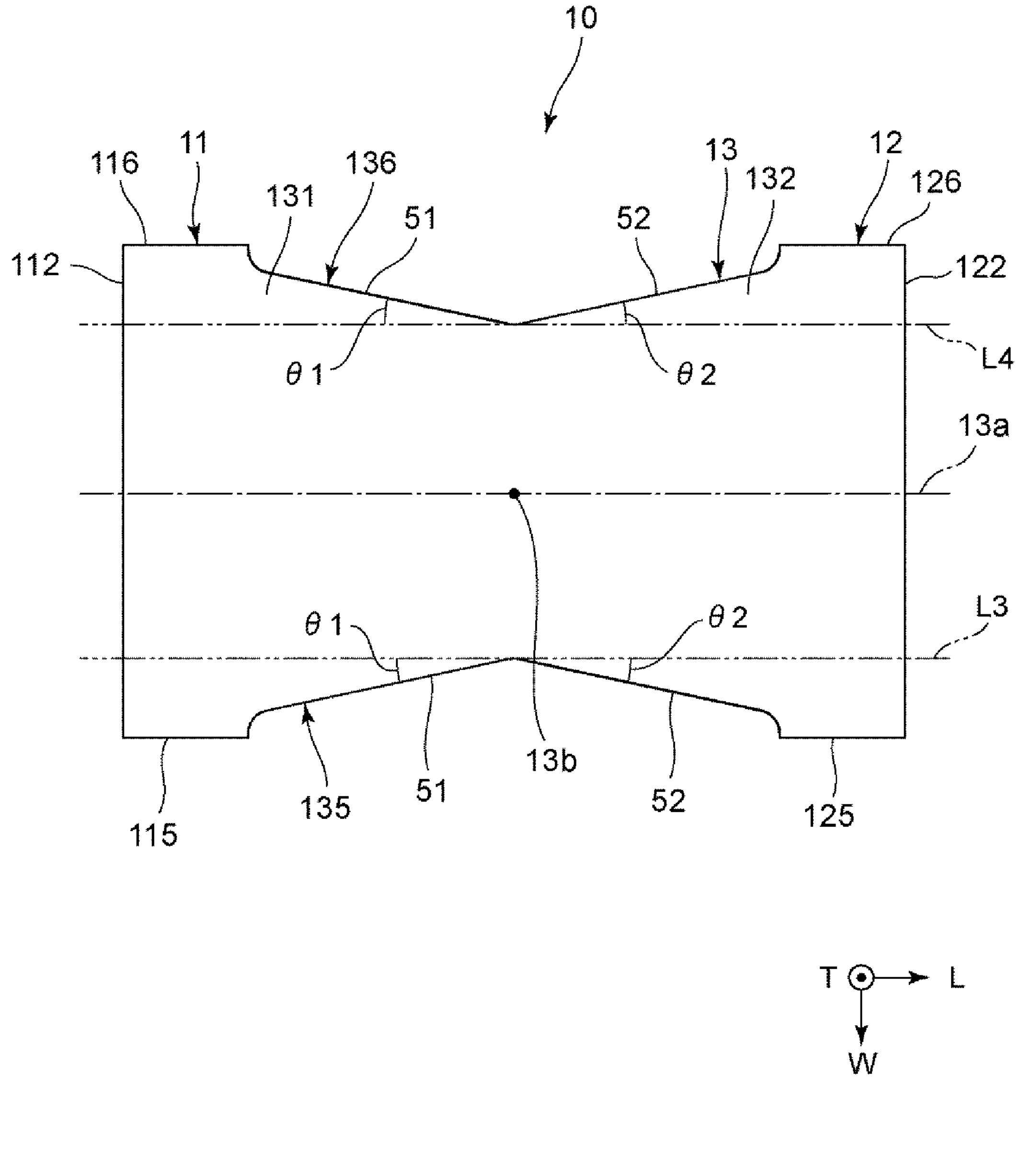
FIG. 6 illustrates an LW-section containing the axis of the core.

FIG. 4 is a top perspective view of the core 10. FIG. 5 illustrates the LT-section containing the axis 13*a* of the core 10. FIG. 6 illustrates an LW-section containing the axis 13*a* of the core 10. In FIGS. 5 and 6, the sections are illustrated with no hatching as a matter of convenience.

As illustrated in FIG. 4, the peripheral face 130 of the core body 13 includes a bottom face 133, a top face 134, and two lateral faces 135 and 136. The bottom face 133 is to face toward the mounting substrate on which the coil component 1 is to be mounted. The top face 134 faces away from the bottom face 133. The two lateral faces 135 and 136 connect the bottom face 133 and the top face 134 to each other. The first lateral face 135 is located on the positive side in the W-direction. The second lateral face 136 is located on the negative side in the W-direction. The bottom face 133, the first lateral face 135, the top face 134, and the second lateral face 136 are arranged side by side in the peripheral direction about the axis 13*a* of the core body 13. While the peripheral face 130 is formed of the four faces, the peripheral face 130 only needs to be formed of three or more faces. In such a configuration, since the peripheral face 130 of the core body 13 is formed of a plurality of faces 133, 134, 135, and 136, the wire 20 wound around the core body 13 is stopped by the ridges formed at the edges of the faces. Therefore, the displacement of the wire 20 is suppressed. Thus, the shape of the wire 20 assuredly conforms to the lines of magnetic flux generated around the peripheral face 130 of the core body 13. Consequently, the interference with the magnetic flux is assuredly reduced.

Preferably, the core body 13 has symmetry with respect to a plane extending orthogonally to the axis 13*a* and passing through the center 13*b* of the core body 13. In such a configuration, since the core body 13 has plane symmetry, the shape of the peripheral face 130 of the core body 13 conforms to the lines of magnetic flux. Consequently, the Q-value is much further increased.

The first flange 11 has an inner end face 111, an outer end face 112, a bottom face 113, a top face 114, and two lateral faces: a first lateral face 115 and a second lateral face 116. The inner end face 111 faces toward the core body 13. The outer end face 112 faces away from the inner end face 111. The bottom face 113 connects the inner end face 111 and the outer end face 112 to each other and is to face toward the mounting substrate on which the coil component 1 is to be mounted. The top face 114 faces away from the bottom face 113. The first lateral face 115 and the second lateral face 116 connect the inner end face 111 and the outer end face 112 to each other and also connect the bottom face 113 and the top face 114 to each other.

The second flange 12 has an inner end face 121, an outer end face 122, a bottom face 123, a top face 124, and two lateral faces: a first lateral face 125 and a second lateral face 126. The inner end face 121 faces toward the core body 13. The outer end face 122 faces away from the inner end face 121. The bottom face 123 is to face toward the mounting substrate on which the coil component 1 is to be mounted. The top face 124 faces away from the bottom face 123. The first lateral face 125 and the second lateral face 126 connect the inner end face 121 and the outer end face 122 to each other and also connect the bottom face 123 and the top face 124 to each other.

As illustrated in FIG. 5, the distance between the top face 134 and the axis 13*a* is smaller on the side near the center 13*b* of the core body 13 than on the side near each of the first end 131 and the second end 132 of the core body 13. In such a configuration, as described above, the shape of the peripheral face 130 of the core body 13 conforms to the lines of magnetic flux. Consequently, the Q-value is increased.

The above relationship of the distance between the top face 134 and the axis 13*a* also applies to the relationship of the distance between the wire 20 and the axis 13*a*, the description of which is omitted. Such an omission also applies to the following description.

The top face 134 includes a first inclined portion 51 and a second inclined portion 52. On the first inclined portion 51, the distance from the axis 13*a* continuously decreases from the side near the first end 131 toward the side near the center 13*b*. On the second inclined portion 52, the distance from the axis 13*a* continuously decreases from the side near the second end 132 toward the side near the center 13*b*. In such a configuration, the shape of the peripheral face 130 of the core body 13 more assuredly conforms to the lines of magnetic flux. Consequently, the Q-value is further increased.

The first inclined portion 51 and the second inclined portion 52 are each flat. The first inclined portion 51 forms a first inclination angle θ1 with respect to a first straight line L1, which is parallel to the axis 13*a*. Preferably, the first inclination angle θ1 is greater than 0° and smaller than or equal to 30° (i.e., from greater than 0° to 30°). The second inclined portion 52 forms a second inclination angle θ2 with respect to the first straight line L1 that is parallel to the axis 13*a*. Preferably, the second inclination angle θ2 is greater than 0° and smaller than or equal to 30° (i.e., from greater than 0° to 30°). The first inclination angle θ1 of the first inclined portion 51 and the second inclination angle θ2 of the second inclined portion 52 are each defined to be 0° when the first or second inclined portion 51 or 52 is parallel to the first straight line L1.

In such a configuration, since the first and second inclination angles θ1 and θ2 are each greater than 0° and smaller than or equal to 30° (i.e., from greater than 0° to 30°), the shape of the peripheral face 130 of the core body 13 much more assuredly conforms to the lines of magnetic flux. Consequently, the Q-value is much further increased. The first and second inclined portions 51 and 52 may each be curved instead of being flat. Herein, the inclination angle of the inclined portion is defined as follows. On the center line of the inclined portion in the width direction (W-direction), letting the point where the inclined portion is closest to the axis 13*a* be a first point; and the point where the inclined portion is farthest from the axis 13*a* be a second point, the inclination angle of the inclined portion is the angle formed by a straight line that connects the first point and the second point to each other with respect to a straight line parallel to the axis 13*a*.

If the first and second inclination angles are each 0°, the interference between the wire 20 wound around the core body 13 and the magnetic flux increases on the side near each of the first end 131 and the second end 132 of the core body 13. Consequently, the eddy-current loss due to the interference with the magnetic flux increases. Accordingly, loss components regarding the wire 20 increase. If the first and second inclination angles are each greater than 30°, the interference between the wire 20 wound around the core body 13 and the magnetic flux increases on the side near the center 13*b* of the core body 13. Consequently, the eddy-current loss due to the interference with the magnetic flux increases. Accordingly, loss components regarding the wire 20 increase.

Preferably, the first inclination angle θ1 and the second inclination angle θ2 are equal, and the first inclined portion 51 and the second inclined portion 52 intersect each other in a plane orthogonal to the axis 13*a* at the center 13*b* of the core body 13. In such a configuration, the first inclined portion 51 and the second inclined portion 52 have plane symmetry with respect to a plane orthogonal to the axis 13*a* at the center 13*b* of the core body 13. Therefore, the shape of the peripheral face 130 of the core body 13 conforms to the lines of magnetic flux.

As illustrated in FIG. 5, the bottom face 133 has the same shape as the top face 134. That is, the distance between the bottom face 133 and the axis 13*a* is smaller on the side near the center 13*b* of the core body 13 than on the side near each of the first end 131 and the second end 132 of the core body 13. The bottom face 133 includes a first inclined portion 51 and a second inclined portion 52. On the first inclined portion 51, the distance from the axis 13*a* continuously decreases from the side near the first end 131 toward the side near the center 13*b*. On the second inclined portion 52, the distance from the axis 13*a* continuously decreases from the side near the second end 132 toward the side near the center 13*b*.

The first inclined portion 51 and the second inclined portion 52 are each flat. The first inclined portion 51 forms a first inclination angle θ1 with respect to a second straight line L2, which is parallel to the axis 13*a*. Preferably, the first inclination angle θ1 is greater than 0° and smaller than or equal to 30° (i.e., from greater than 0° to 30°). The second inclined portion 52 forms a second inclination angle θ2 with respect to the second straight line L2 that is parallel to the axis 13*a*. Preferably, the second inclination angle θ2 is greater than 0° and smaller than or equal to 30° (i.e., from greater than 0° to 30°).

The first inclination angle θ1 of the bottom face 133 and the first inclination angle θ1 of the top face 134 are equal but may be different. The second inclination angle θ2 of the bottom face 133 and the second inclination angle θ2 of the top face 134 are equal but may be different.

As illustrated in FIG. 6, the first lateral face 135 has the same shape as the top face 134 and the bottom face 133. That is, the distance between the first lateral face 135 and the axis 13*a* is smaller on the side near the center 13*b* of the core body 13 than on the side near each of the first end 131 and the second end 132 of the core body 13. The first lateral face 135 includes a first inclined portion 51 and a second inclined portion 52. On the first inclined portion 51, the distance from the axis 13*a* continuously decreases from the side near the first end 131 toward the side near the center 13*b*. On the second inclined portion 52, the distance from the axis 13*a* continuously decreases from the side near the second end 132 toward the side near the center 13*b*.

The first inclined portion 51 and the second inclined portion 52 are each flat. The first inclined portion 51 forms a first inclination angle θ1 with respect to a third straight line L3, which is parallel to the axis 13*a*. Preferably, the first inclination angle θ1 is greater than 0° and smaller than or equal to 30° (i.e., from greater than 0° to 30°). The second inclined portion 52 forms a second inclination angle θ2 with respect to the third straight line L3 that is parallel to the axis 13*a*. Preferably, the second inclination angle θ2 is greater than 0° and smaller than or equal to 30° (i.e., from greater than 0° to 30°).

The first inclination angle θ1 of the first lateral face 135 and the first inclination angle θ1 of each of the bottom face 133 and the top face 134 are equal but may be different. The second inclination angle θ2 of the first lateral face 135 and the second inclination angle 02 of each of the bottom face 133 and the top face 134 are equal but may be different.

As illustrated in FIG. 6, the second lateral face 136 has the same shape as the top face 134 and the bottom face 133. That is, the distance between the second lateral face 136 and the axis 13*a* is smaller on the side near the center 13*b* of the core body 13 than on the side near each of the first end 131 and the second end 132 of the core body 13. The second lateral face 136 includes a first inclined portion 51 and a second inclined portion 52. On the first inclined portion 51, the distance from the axis 13*a* continuously decreases from the side near the first end 131 toward the side near the center 13*b*. On the second inclined portion 52, the distance from the axis 13*a* continuously decreases from the side near the second end 132 toward the side near the center 13*b*.

The first inclined portion 51 and the second inclined portion 52 are each flat. The first inclined portion 51 forms a first inclination angle θ1 with respect to a fourth straight line L4, which is parallel to the axis 13*a*. Preferably, the first inclination angle θ1 is greater than 0° and smaller than or equal to 30° (i.e., from greater than 0° to 30°). The second inclined portion 52 forms a second inclination angle θ2 with respect to the fourth straight line L4 that is parallel to the axis 13*a*. Preferably, the second inclination angle θ2 is greater than 0° and smaller than or equal to 30° (i.e., from greater than 0° to 30°).

The first inclination angle θ1 of the second lateral face 136 and the first inclination angle θ1 of the first lateral face 135 are equal but may be different. The second inclination angle θ2 of the second lateral face 136 and the second inclination angle θ2 of the first lateral face 135 are equal but may be different.

As illustrated in FIGS. 5 and 6, all of the faces (the bottom face 133, the top face 134, the first lateral face 135, and the second lateral face 136) forming the peripheral face 130 are each formed of the first inclined portion 51 and the second inclined portion 52. In such a configuration, the shape of the peripheral face 130 of the core body 13 conforms to the lines of magnetic flux. Therefore, the shape of the wire 20 wound around the peripheral face 130 of the core body 13 conforms to the lines of magnetic flux. Consequently, the Q-value is much further increased. Note that at least one of the faces only needs to be formed of the first inclined portion 51 and the second inclined portion 52. In other words, the distance between at least one of the faces and the axis 13*a* only needs to be smaller on the side near the center 13*b* of the core body 13 than on the side near each of the first end 131 and the second end 132 of the core body 13.

Preferably, the first inclination angle of the first inclined portion 51 of at least one of the faces with respect to a straight line parallel to the axis 13*a* is different from the first inclination angle of the first inclined portion 51 of another of the faces with respect to a straight line parallel to the axis 13*a*, and the second inclination angle of the second inclined portion 52 of at least one of the faces with respect to a straight line parallel to the axis 13*a* is different from the second inclination angle of the second inclined portion 52 of another of the faces with respect to a straight line parallel to the axis 13*a*. In such a configuration, the shape of the peripheral face 130 of the core body 13 is adjusted to conform to the lines of magnetic flux. Therefore, the shape of the wire 20 wound around the peripheral face 130 of the core body 13 is adjusted to conform to the lines of magnetic flux. Consequently, the Q-value is much further increased.

[Method of Manufacturing Coil Component]

First, powder chiefly composed of alumina is prepared as the material for the core and is put into a female die. Then, the powder in the female die is pressed with a male die, whereby a core including a core body and flanges is obtained. In this step, the peripheral face of the core body is made to incline such that the core body is narrowed from the two ends of the core body toward the center of the core body. Then, the core is fired to be solidified.

Subsequently, outer electrodes are formed on the flanges of the core. Specifically, the bottom faces of the flanges of the core are dipped into Ag paste prepared in a container, whereby the Ag paste is made to adhere to the bottom faces of the flanges. Then, the Ag paste adhere to the flanges is dried and is fired, whereby Ag films serving as the foundations for outer electrodes are formed. Furthermore, a metal film based on a Ni alloy is formed over the Ag film by electroplating or the like. Through the above steps, outer electrodes are obtained.

Subsequently, a wire is wound around the core body of the core. In this step, two end portions of the wire are each extended from the core body by a predetermined length. The end portions of the wire that are extended from the core body are connected to the respective outer electrodes by thermo-compression bonding.

Subsequently, a resin member is formed on the core. Specifically, the top face of the core, where no outer electrodes are formed, is partially dipped into a resin member prepared in a container, whereby the resin member is made to adhere to the top face of the core. Then, the resin member thus made to adhere is irradiated with ultraviolet light for a long time to be cured so as not to deform when picked up by a mounter. Through the above steps, a coil component is obtained.

Examples

The coil component illustrated in FIG. 1 was prepared as a working example. A coil component including a core body whose peripheral face includes no inclined portions as in the related art was prepared as a comparative example. Then, the inductance value (L-value) and the Q-value were calculated for each of the working example and the comparative example.

Figure 7A:
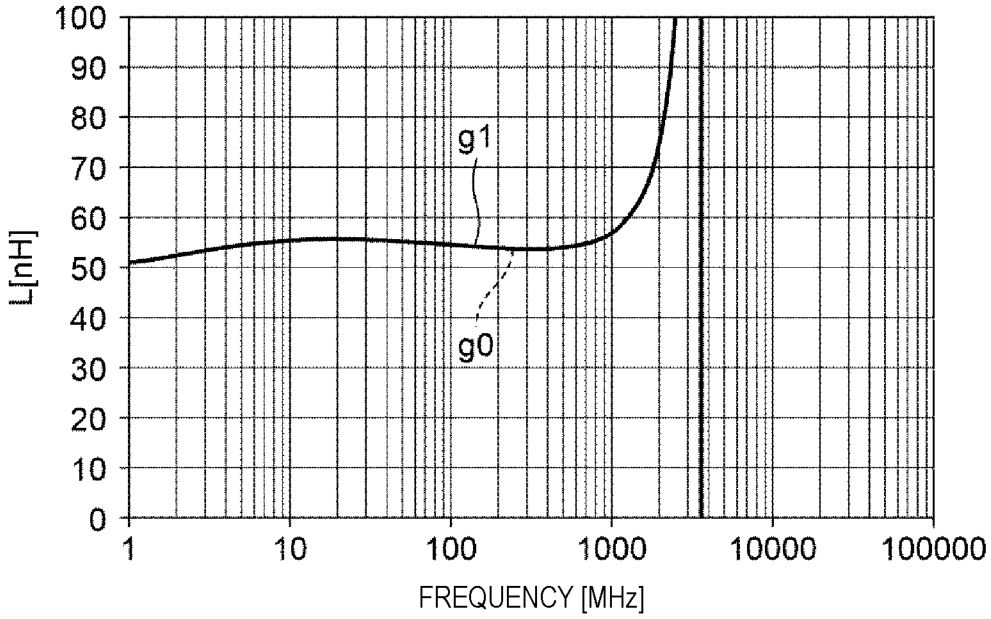
FIG. 7A is a graph illustrating the relationship between frequency and the L-value for cases with and without inclined portions.
Figure 7B:
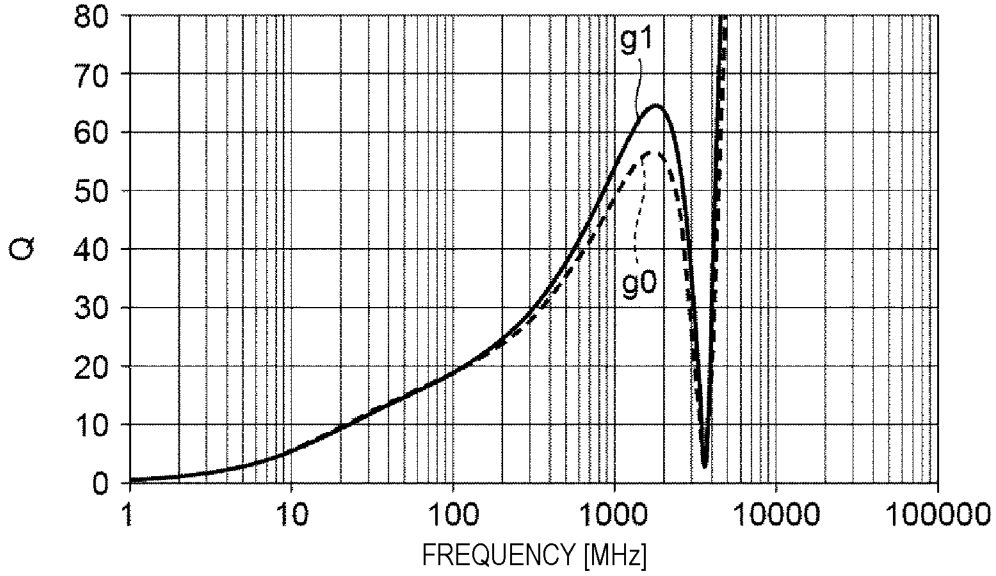
FIG. 7B is a graph illustrating the relationship between frequency and the Q-value for cases with and without the inclined portions.

FIG. 7A is a graph illustrating the relationship between frequency and the L-value. FIG. 7B is a graph illustrating the relationship between frequency and the Q-value. Graph g1 represents the working example. Graph g0 represents the comparative example. Graph g1 is illustrated by a solid line. Graph g0 is illustrated by a dotted line. In FIG. 7A, graph g1 and graph g2 completely coincide with each other.

As illustrated in FIG. 7A, there is no difference in the L-value between the working example and the comparative example. The reason for this is as follows. The sectional area of the wire and the elements employed in the working example are the same as those of the comparative example. Accordingly, there is substantially no difference in the inductance value between the two. Therefore, in terms of obtaining the Q-value, the working example can be designed with some expandability such as the allowance for the increase in the perimeter of the wire and the increase in the perimeter of the core body.

As illustrated in FIG. 7B, the Q-value is greater in the working example than in the comparative example. The reason for this is as follows. In the comparative example, the wire interferes with the lines of magnetic flux at the two ends of the core body. Therefore, the eddy-current loss increases. Consequently, relevant loss components increase. In the working example, since the shape of the core body conforms to the lines of magnetic flux, the wire is arranged in conformity with the distribution of magnetic flux. Such an arrangement reduces the eddy-current loss due to the overlap between the wire and the magnetic flux. Thus, compared with the comparative example, the working example achieves a reduction in the eddy-current loss due to the interference with the magnetic flux, thereby achieving a reduction in loss components regarding the wire and consequently an increase in the Q-value.

Figure 8:
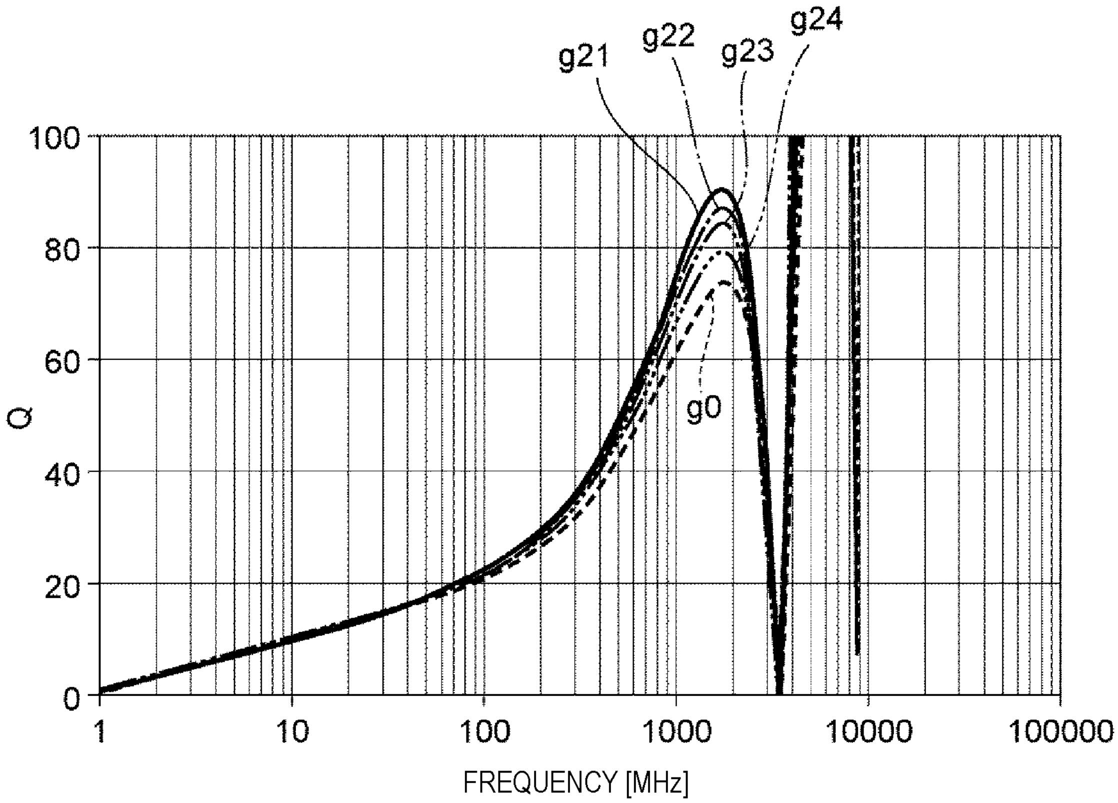
FIG. 8 is a graph illustrating the relationship between frequency and the Q-value for cases with inclined portions at different inclination angles.

FIG. 8 illustrates the relationship between frequency and the Q-value for cases with inclined portions at different inclination angles. Graphs g21, g22, g23, and g24 represent working examples. Graph g0 represents a comparative example. Graph g21 is illustrated by a solid line. Graph g22 is illustrated by a one-dot chain line. Graph g23 is illustrated by a two-dot chain line. Graph g24 is illustrated by a three-dot chain line. Graph g0 is illustrated by a dotted line.

Graph g21 represents the Q-value when the first inclination angle θ1 and the second inclination angle θ2 of each of the bottom face, the top face, the first lateral face, and the second lateral face of the core body are 30°.

Graph g22 represents the Q-value when the first inclination angle θ1 and the second inclination angle θ2 of each of the bottom face, the top face, the first lateral face, and the second lateral face of the core body are 15°.

Graph g23 represents the Q-value when the first inclination angle θ1 and the second inclination angle θ2 of each of the bottom face, the top face, the first lateral face, and the second lateral face of the core body are 10°.

Graph g24 represents the Q-value when the first inclination angle θ1 and the second inclination angle θ2 of each of the bottom face, the top face, the first lateral face, and the second lateral face of the core body are 5°.

Graph g0 represents the Q-value when the first inclination angle θ1 and the second inclination angle θ2 of each of the bottom face, the top face, the first lateral face, and the second lateral face of the core body are 0°.

As illustrated in FIG. 8, the Q-value increases in order of graph g0, graph g24, graph g23, graph g22, and graph g21. For example, at a frequency of 2 GHz, the Q-value in graph g0 is 72.79, the Q-value in graph g24 is 77.52, the Q-value in graph g23 is 82.661, the Q-value in graph g22 is 85.538, and the Q-value in graph g21 is 88.375. In terms of quality, the Q-value in graph g0 is low and not preferable, whereas the Q-values in graphs g24, g23, g22, and g21 are high and preferable.

The reason for this is as follows. As the inclination angle increases from 0° to 30°, the conformity in the shape of the peripheral face of the core body with the lines of magnetic flux increases, that is, the probability of interference between the magnetic flux and the wire decreases. Consequently, the eddy-current loss due to the interference with the magnetic flux decreases to decrease loss components regarding the wire, which increases the Q-value. On the other hand, when the inclination angle exceeds 30°, the probability of interference between the magnetic flux and the wire on the side near the center of the core body starts to increase. Consequently, the eddy-current loss due to the interference with the magnetic flux increases to increase loss components regarding the wire, which decreases the Q-value. Hence, a preferable inclination angle is greater than 0° and smaller than or equal to 30° (i.e., from greater than 0° to 30°), which increases the Q-value.

When the inclination angle exceeds 40°, it becomes difficult to wind the wire around the core body because the wire tends to slip on the peripheral face of the core body while being wound around the core body.

Second Embodiment

Figure 9:
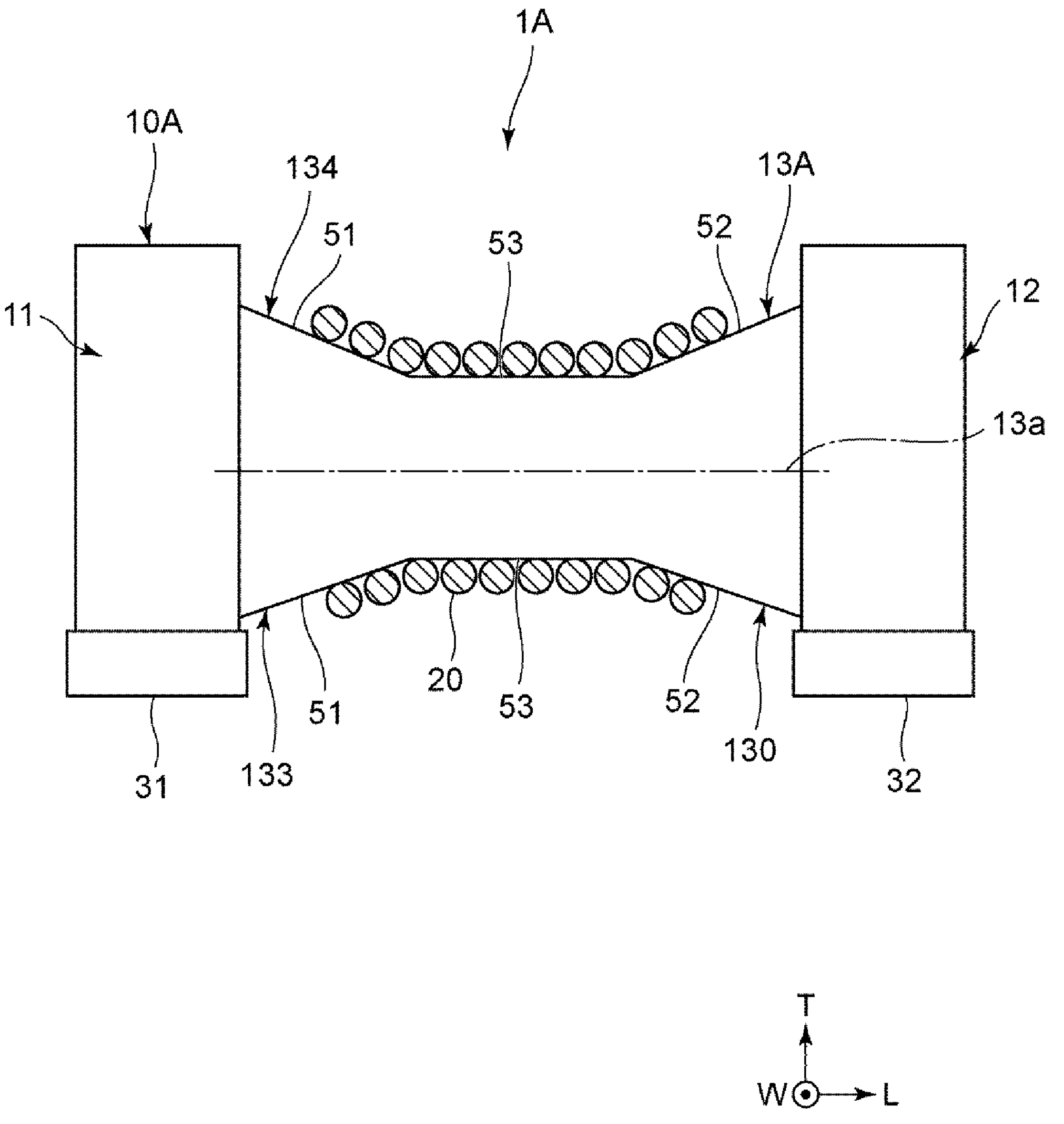
FIG. 9 is a side view of a second embodiment of the coil component.

FIG. 9 is a side view of a second embodiment of the coil component. The second embodiment differs from the first embodiment in the shape of the core body of the core. The difference will now be described. The other elements are the same as those of the first embodiment and are denoted by corresponding ones of the reference signs used in the first embodiment, and redundant description of such elements is omitted. In FIG. 9, as a matter of convenience, the resin member 15 is not illustrated, and the wire 20 is illustrated in sectional view.

As illustrated in FIG. 9, a coil component 1A according to the second embodiment includes a core 10A, which includes a core body 13A. The core body 13A has a top face 134 and a bottom face 133, each of which includes a first inclined portion 51, a second inclined portion 52, and a horizontal portion 53. The horizontal portion 53 is located between and connected to the first inclined portion 51 and the second inclined portion 52. The first inclined portion 51 and the second inclined portion 52 are configured in the same manner as in the first embodiment. The horizontal portion 53 is parallel to the axis 13*a*. The wire 20 is wound by one or more turns on each of the first inclined portion 51 and the second inclined portion 52 and by two or more turns on the horizontal portion 53. In such a configuration, the shape of the wire 20 wound around the peripheral face 130 of the core body 13A conforms to the lines of magnetic flux. Consequently, the Q-value is much further increased. In addition, providing the horizontal portion 53 between the first inclined portion 51 and the second inclined portion 52 suppresses the disturbance in the wire 20 on the first inclined portion 51 and on the second inclined portion 52.

Preferably, all of the faces forming the peripheral face 130 of the core body 13A each include the first inclined portion 51, the second inclined portion 52, and the horizontal portion 53. In such a configuration, the shape of the wire 20 wound around the peripheral face 130 of the core body 13A conforms to the lines of magnetic flux. Consequently, the Q-value is much further increased. Note that at least one of the faces forming the peripheral face 130 only needs to be formed of the first inclined portion 51, the second inclined portion 52, and the horizontal portion 53.

Third Embodiment

Figure 10:
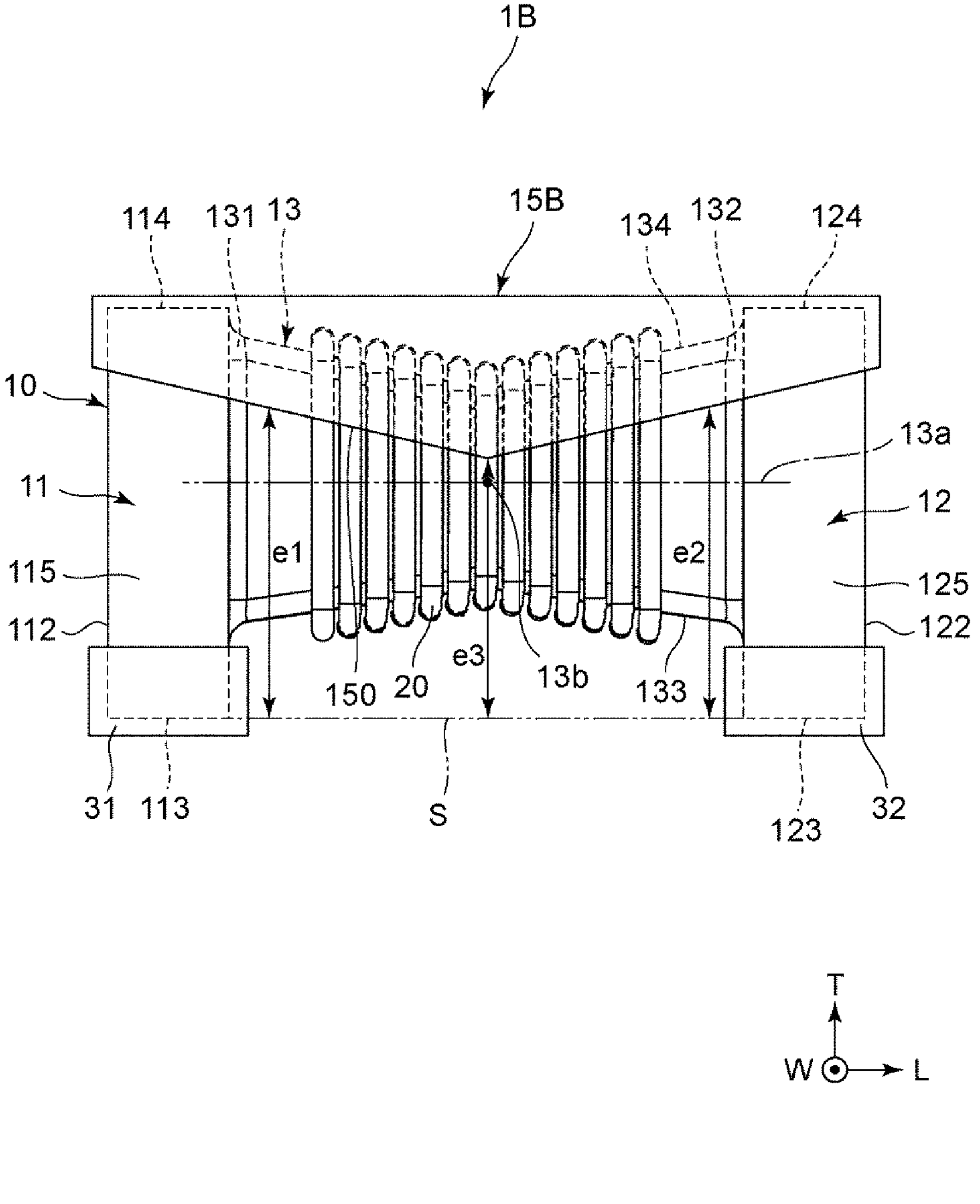
FIG. 10 is a side view of a third embodiment of the coil component.

FIG. 10 is a side view of a third embodiment of the coil component. The third embodiment differs from the first embodiment in the shape of the resin member. The difference will now be described. The other elements are the same as those of the first embodiment and are denoted by corresponding ones of the reference signs used in the first embodiment, and redundant description of such elements is omitted.

As illustrated in FIG. 10, a coil component 1B according to the third embodiment includes a resin member 15B, which covers the first flange 11, the second flange 12, the core body 13, and the wire 20 in an area on the top-face side in the height direction (T-direction). Seen in a direction orthogonal to the first lateral face 115 of the first flange 11, the resin member 15B has a lower edge 150, which is located on the lower side in the height direction and extends over the area covering the core body 13 and the wire 20. An extension plane S is extended from the bottom face 113 of the first flange 11 and is in contact with the bottom face 123 of the second flange 12.

Seen in the direction orthogonal to the first lateral face 115 of the first flange 11, the distance between the lower edge 150 and the extension plane S is smaller on the side near the center 13*b* of the core body 13 than on the side near each of the first end 131 and the second end 132 of the core body 13. Specifically, seen in the direction orthogonal to the first lateral face 115 of the first flange 11, the distance, e3, between the lower edge 150 and the extension plane S at the center 13*b* of the core body 13 is smaller than the distance, e1, between the lower edge 150 and the extension plane S at the first end 131 of the core body 13 and is smaller than the distance, e2, between the lower edge 150 and the extension plane S at the second end 132 of the core body 13.

In such a configuration, seen in the direction orthogonal to the first lateral face 115 of the first flange 11, the area of contact between the resin member 15B and the wire 20 is smaller than in a case where the lower edge 150 is parallel to the axis 13*a*. Therefore, the stray capacitance between the resin member 15B and the wire 20 is reduced. Consequently, the Q-value is increased. Specifically, the resin member 15B has a higher permittivity μ than air. Therefore, a stray capacitance is generated between the resin member 15B and the wire 20. Such a stray capacitance is reduced. More specifically, the stray capacitance, C, in the expression for obtaining the Q-value ($Q=1/R\times\sqrt{(L/C)}$) is reduced. Therefore, the Q-value is increased.

Preferably, seen in a direction orthogonal to the second lateral face 116 of the first flange 11, the distance between the lower edge 150 and the extension plane S is smaller on the side near the center 13*b* of the core body 13 than on the side near each of the first end 131 and the second end 132 of the core body 13. In such a configuration, the stray capacitance between the resin member 15B and the wire 20 is further reduced. Consequently, the Q-value is further increased.

Preferably, seen in the direction orthogonal to the first lateral face 115 of the first flange 11, the lower edge 150 of the resin member 15B is located on the top-face side of the core 10 with respect to the axis 13*a*. In such a configuration, the stray capacitance between the resin member 15B and the wire 20 is further reduced. Consequently, the Q-value is further increased.

Figure 11:
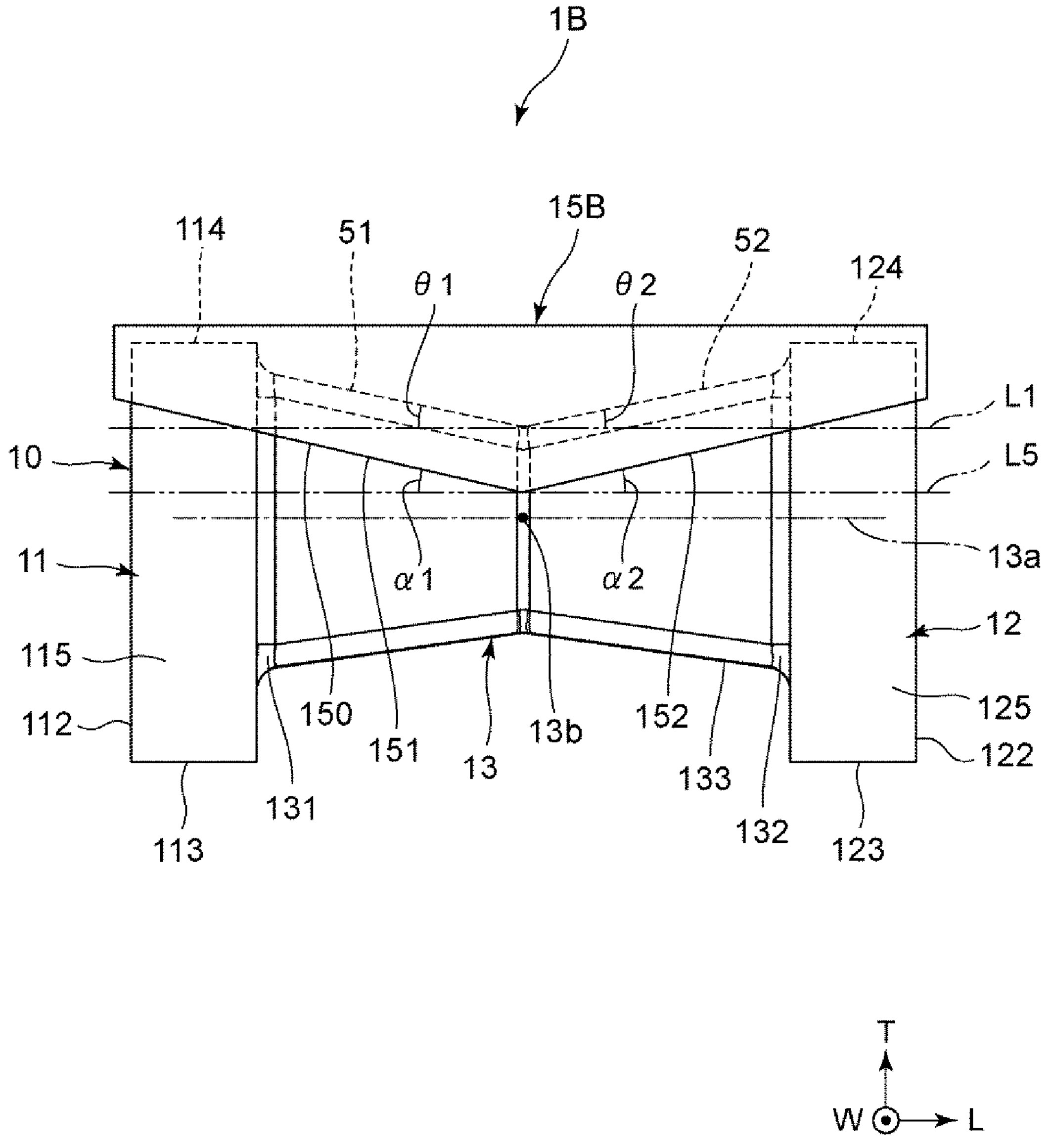
FIG. 11 is a side view of the third embodiment of the coil component.

FIG. 11 is a side view of the third embodiment of the coil component. In FIG. 11, the wire 20 and the first and second outer electrodes 31 and 32, which are illustrated in FIG. 10, are not illustrated. As illustrated in FIG. 11, seen in the direction orthogonal to the first lateral face 115 of the first flange 11, the lower edge 150 of the resin member 15B includes a first oblique side 151 and a second oblique side 152. On the first oblique side 151, the distance from the extension plane S continuously decreases from the side near the first end 131 toward the side near the center 13*b*. On the second oblique side 152, the distance from the extension plane S continuously decreases from the side near the second end 132 toward the side near the center 13*b*. Preferably, seen in the direction orthogonal to the second lateral face 116 of the first flange 11, the lower edge 150 of the resin member 15B includes a first oblique side 151 and a second oblique side 152.

In such a configuration, since the lower edge 150 of the resin member 15B includes the first and second oblique sides 151 and 152, the area of contact between the resin member 15B and the wire 20 is further reduced. Therefore, the stray capacitance between the resin member 15B and the wire 20 is much further reduced. Consequently, the Q-value is much further increased. The lower edge 150 may include not only the first and second oblique sides 151 and 152 but also, for example, a horizontal side located between the first oblique side 151 and the second oblique side 152 and being parallel to the axis 13*a*.

The first inclined portion 51 and the second inclined portion 52 are linear. Seen in the direction orthogonal to the first lateral face 115 of the first flange 11, the first oblique side 151 forms a first inclination angle $\alpha 1$ with respect to a fifth straight line L5, which is parallel to the axis 13*a*. The first inclination angle $\alpha 1$ is equal to or greater than the first inclination angle $\theta 1$ of the first inclined portion 51 with respect to the first straight line L1 that is parallel to the axis 13*a*. Furthermore, the second oblique side 152 forms a second inclination angle $\alpha 2$ with respect to the fifth straight line L5 that is parallel to the axis 13*a*. The second inclination angle α2 is equal to or greater than the second inclination angle θ2 of the second inclined portion 52 with respect to the first straight line L1 that is parallel to the axis 13*a*. The first inclination angle α1 of the first oblique side 151 and the second inclination angle α2 of the second oblique side 152 are each defined to be 0° when the first or second oblique side 51 or 52 is parallel to the first straight line L1.

In such a configuration, since the first inclination angle α1 of the first oblique side 151 is equal to or greater than the first inclination angle θ1 of the first inclined portion 51 while the second inclination angle α2 of the second oblique side 152 is equal to or greater than the second inclination angle θ2 of the second inclined portion 52, the area of contact between the resin member 15B and the wire 20 is much further reduced. Therefore, the stray capacitance between the resin member 15B and the wire 20 is much further reduced. Consequently, the Q-value is much further increased.

Preferably, the first inclination angle α1 of the first oblique side 151 is greater than the first inclination angle θ1 of the first inclined portion 51 while the second inclination angle α2 of the second oblique side 152 is greater than the second inclination angle θ2 of the second inclined portion 52. Thus, the area of contact between the resin member 15B and the wire 20 is much further reduced.

The first and second oblique sides 151 and 152 may each be curved instead of being linear. Herein, the inclination angle of the oblique side is defined as follows. Seen in the direction orthogonal to the lateral face of the flange, letting the point where the oblique side is closest to the extension plane S be a first point; and the point where the oblique side is farthest from the extension plane S be a second point, the inclination angle of the oblique side is the angle formed by a straight line that connects the first point and the second point to each other with respect to a straight line parallel to the axis 13*a*.

Figure 12A:
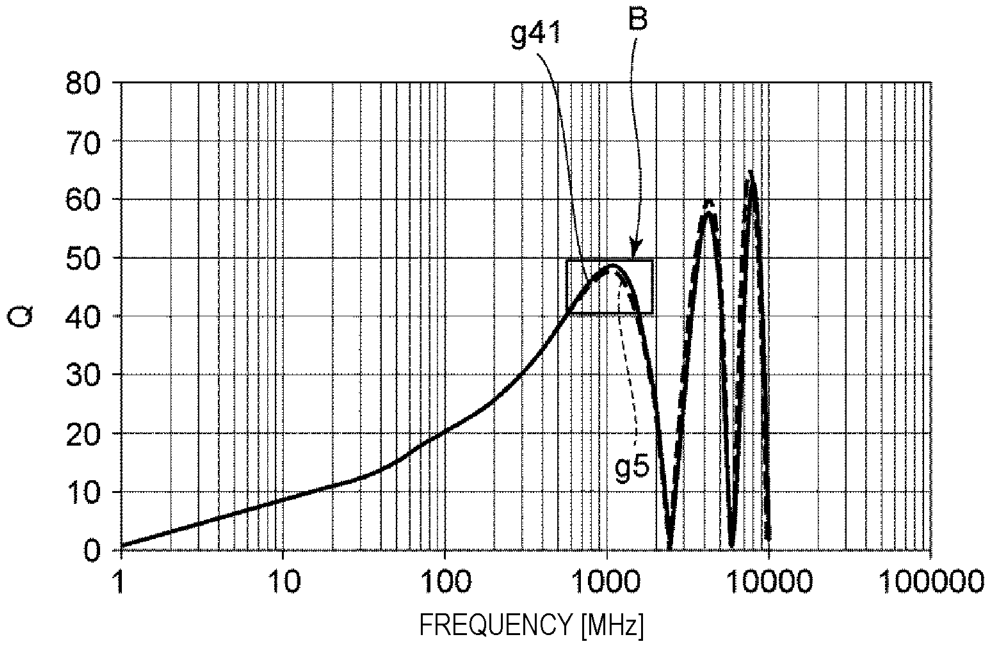
FIG. 12A a graph illustrating the relationship between frequency and the Q-value for cases with oblique sides at different inclination angles.
Figure 12B:
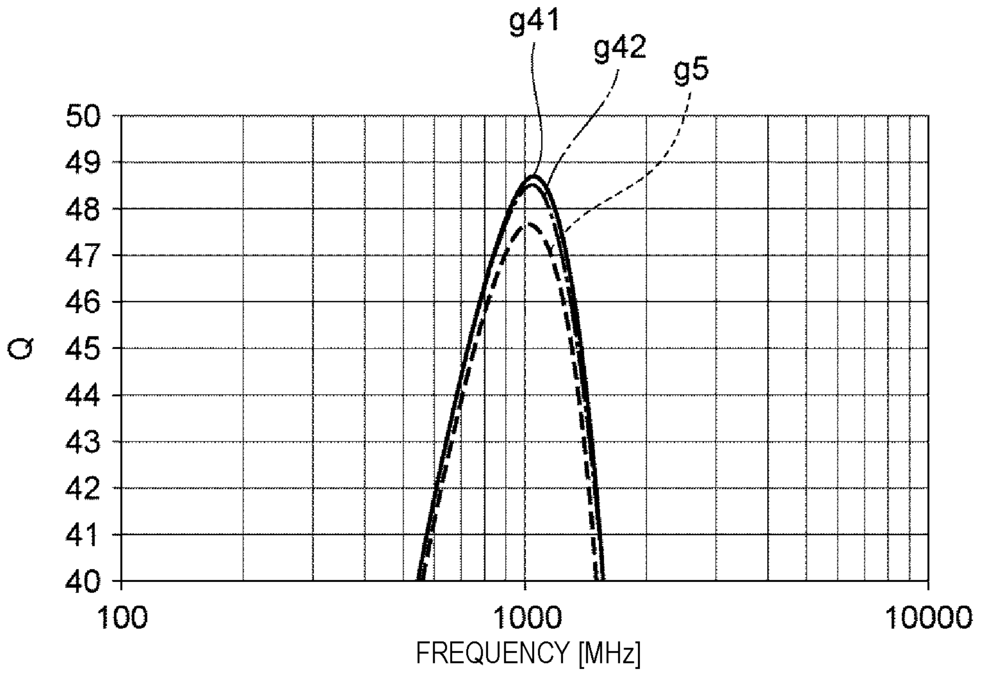
FIG. 12B is an enlargement of part B of FIG. 12A.

FIG. 12A is a graph illustrating the relationship between frequency and the Q-value. FIG. 12B is an enlargement of part B of FIG. 12A. Graphs g41 and g42 represent working examples. Graph g5 represents a reference example. Graph g41 is illustrated by a solid line. Graph g42 is illustrated by a one-dot chain line. Graph g5 is illustrated by a dotted line. Graph g41 and graph g42 coincide with each other excluding some part. Graph g41 and graph g5 coincide with each other excluding some part.

Graph g41 represents the Q-value when the first inclination angle α1 of the first oblique side 151 is greater than the first inclination angle θ1 of the first inclined portion 51 while the second inclination angle α2 of the second oblique side 152 is greater than the second inclination angle θ2 of the second inclined portion 52. Graph g42 represents the Q-value when the first inclination angle α1 of the first oblique side 151 is equal to the first inclination angle θ1 of the first inclined portion 51 while the second inclination angle α2 of the second oblique side 152 is equal to the second inclination angle θ2 of the second inclined portion 52. Graph g5 represents the Q-value in a case where the core body 13 includes the first inclined portion 51 and the second inclined portion 52 but the lower edge 150 of the resin member 15B includes neither the first oblique side 151 nor the second oblique side 152 and is parallel to the axis 13*a*.

As illustrated in FIG. 12B, at a frequency of 1 GHz, the Q-values in graph g41 and graph g42 are each greater than the Q-value in graph g5. Furthermore, the Q-value in graph g41 is slightly greater than the Q-value in graph g42.

Now, a method of forming the resin member 15B having the lower edge 150 will be described. In the process from the step of dipping the core into a resin member to the step of curing the resin member with ultraviolet light, for example, the time period or intensity of ultraviolet irradiation is controlled, whereby the level of the lower edge of the resin member is controlled. Specifically, if ultraviolet light is applied earlier to a part of the resin member at each of the end portions of the core body than to a part of the resin member in a central portion of the core body or if the intensity of ultraviolet light applied to the resin member is made higher for a part of the resin member at each of the end portions of the core body than for a part of the resin member at a central portion of the core body, the resin member is prevented from running down under the apparent gravity from the entirety of the core body but is allowed to run down only at the central portion of the core body. Furthermore, the capillarity exerted between adjacent ones of the turns of the wire acts to allow only a part of the resin member at the central portion of the core body to run down. Thus, a resin member having a lower edge including a first oblique side and a second oblique side is obtained.

Preferably, as illustrated in FIGS. 10 and 11, the resin member 15B extends up to a part of the outer end face 112, a part of the first lateral face 115, and a part of the second lateral face 116 of the first flange 11. Thus, the resin member 15B is less likely to peel. Furthermore, the thickness of the resin member 15B decreases toward the bottom-face side of the core 10 in the height direction. The thickness of the resin member 15B refers to the distance from the surface of the core 10 that is in contact with the resin member 15B to the outer surface of the resin member 15B. Thus, the amount of the resin member 15B that covers the wire 20 is reduced. Accordingly, the stray capacitance is reduced. Consequently, the Q-value is further increased.

Fourth Embodiment

Figure 13:
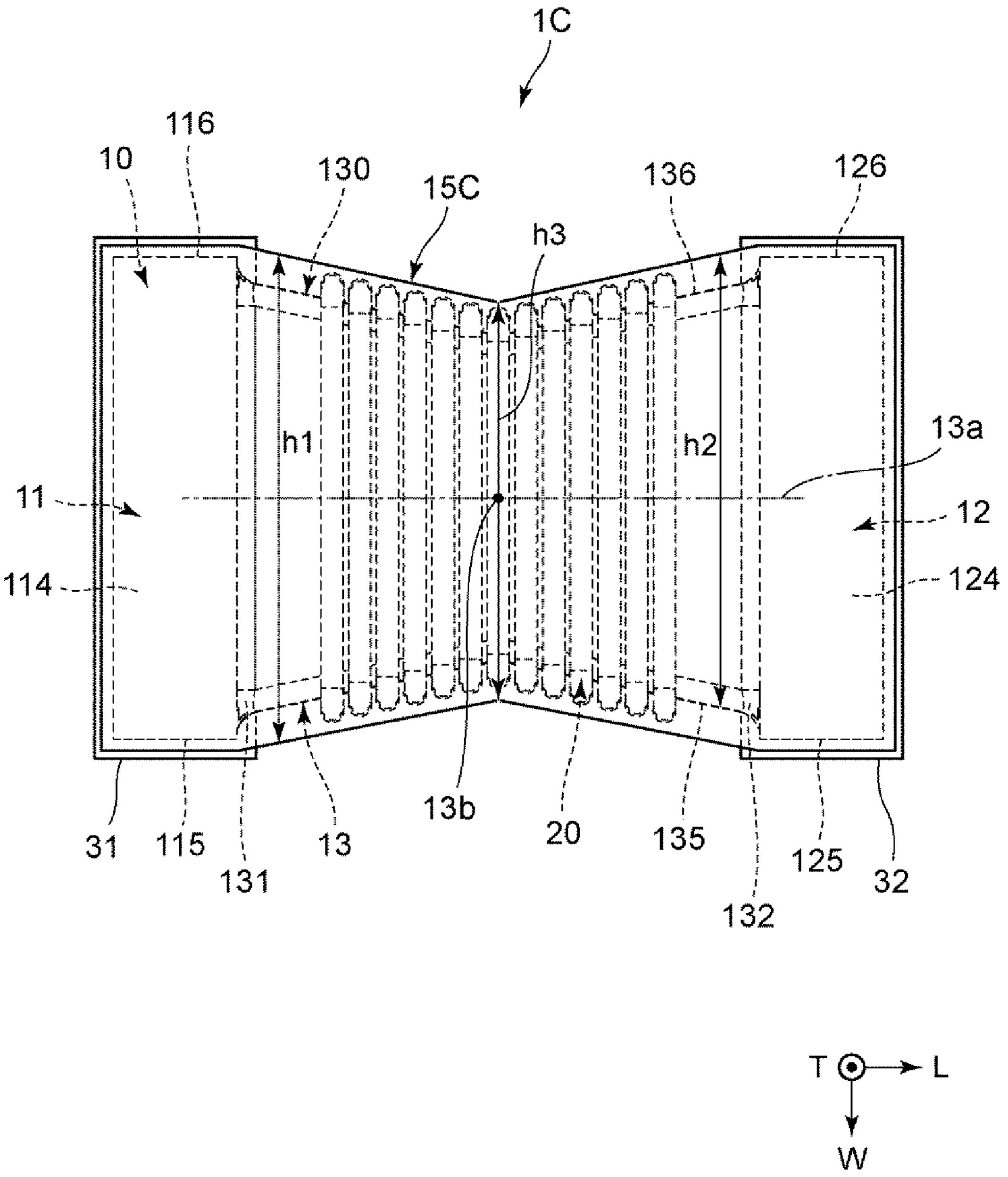
FIG. 13 is a side view of a fourth embodiment of the coil component.

FIG. 13 is a side view of a fourth embodiment of the coil component. The fourth embodiment differs from the first embodiment in the shape of the resin member. The difference will now be described. The other elements are the same as those of the first embodiment and are denoted by corresponding ones of the reference signs used in the first embodiment, and redundant description of such elements is omitted.

As illustrated in FIG. 13, a coil component 1C according to the fourth embodiment includes a resin member 15C. Seen in a direction orthogonal to the top face 114 of the first flange 11, the width of the resin member 15C in a direction (the W-direction) orthogonal to the axis 13*a* is smaller on the side near the center 13*b* of the core body 13 than on the side near each of the first end 131 and the second end 132 of the core body 13. Specifically, seen in the direction orthogonal to the top face 114 of the first flange 11, the width, h3, of the resin member 15C at the center 13*b* of the core body 13 is smaller than the width, h1, of the resin member 15C at the first end 131 of the core body 13 and is smaller than the width, h2, of the resin member 15C at the second end 132 of the core body 13. That is, seen in the T-direction, the shape of each of the lateral faces of the resin member 15C conforms to a corresponding one of the first lateral face 135 (the first and second inclined portions 51 and 52) and the second lateral face 136 (the first and second inclined portions 51 and 52) of the core body 13.

In such a configuration, seen in the direction orthogonal to the top face 114 of the first flange 11 and orthogonal to the axis 13*a*, the resin member 15C is depressed on the side near the center 13*b* of the core body 13. Thus, the increase in the width of the coil component 1 that is caused by providing the resin member 15C is suppressed. To form the resin member 15C with the depressed lateral faces, the depth to which the core 10 is to be dipped into the resin member is reduced to control the amount of resin member that adheres to the core 10.

The resin member 15C with the depressed lateral faces may be applied to the coil component 1A according to the second embodiment. In that case, seen in the T-direction, the shape of each of the lateral faces of the resin member 15C conforms to a corresponding one of the first lateral face 135 (the first and second inclined portions 51 and 52 and the horizontal portion 53) and the second lateral face 136 (the first and second inclined portions 51 and 52 and the horizontal portion 53) of the core body 13.

The present disclosure is not limited to the above embodiments, and any design change can be made thereto without departing from the essence of the present disclosure. For example, the features of the first to fourth embodiments may be combined in any way.

While the above embodiments each employ a single wire and two outer electrodes, more numbers of wires and outer electrodes may be employed.

While the above embodiments each employ a core body having a peripheral face forming a rectangular shape in a section orthogonal to the axis of the core body, the peripheral face may form any other polygon such as a triangle or a pentagon, or any other shape such as a circle or an ellipse.

While the above embodiments each employ a core body having a peripheral face including inclined portions, the peripheral face of the core body may include portions each having a stepwise shape (also referred to as stepped portion) in which the distance from the axis decreases in a graded manner from the side near the first end (the second end) of the core body toward the side near the center of the core body.

While the above embodiments each employ a resin member having a lower edge including oblique sides, the resin member may include sides each having a stepwise shape (also referred to as stepped side) in which the distance from the extension plane decreases in a graded manner from the side near the first end (the second end) of the core body toward the side near the center of the core body.

What is claimed is:

1. A coil component comprising:

a core including a core body, a first flange at a first end of the core body, and a second flange at a second end of the core body;

a first outer electrode on the first flange;

a second outer electrode on the second flange;

a wire wound around the core body and electrically connected to the first outer electrode and to the second outer electrode; and a resin member having a surface contacting and covering at least a portion of the core body and the wire, wherein the core body has a peripheral face extending in a peripheral direction about an axis of the core body, and in a section containing the axis of the core body, a distance between at least a part of the peripheral face and the axis is smaller on a side near a center of the core body in a direction of the axis than on a side near each of the first end and the second end of the core body while a distance between the wire and the axis is smaller on the side near the center of the core body in the direction of the axis than on the side near each of the first end and the second end of the core body, the surface is inclined with respect to the axis of the core body from the side near the center of the core body to the side near each of the first end and the second end of the core body, and a thickness of the resin member in a direction orthogonal to the axis decreases in the direction of the axis from the side near the center of the core body to the side near each of the first end and the second end of the core body.

2. The coil component according to claim 1, wherein the peripheral face of the core body is configured of a plurality of faces arranged side by side in the peripheral direction about the axis of the core body, and a distance between at least one of the faces and the axis is smaller on the side near the center of the core body in the direction of the axis than on the side near each of the first end and the second end of the core body.

3. The coil component according to claim 2, wherein the at least one of the faces includes a first inclined portion a distance of which from the axis continuously decreases from the side near the first end toward the side near the center, and a second inclined portion a distance of which from the axis continuously decreases from the side near the second end toward the side near the center.

4. The coil component according to claim 3, wherein the first inclined portion and the second inclined portion are each flat, and an inclination angle of each of the first inclined portion and the second inclined portion with respect to a straight line parallel to the axis is from greater than 0° to 30°.

5. The coil component according to claim 3, wherein the at least one of the faces includes the first inclined portion, the second inclined portion, and a horizontal portion, the horizontal portion being located between and connected to the first inclined portion and the second inclined portion, and the horizontal portion being parallel to the axis, and the wire is wound by one or more turns on each of the first inclined portion and the second inclined portion and by two or more turns on the horizontal portion.

6. The coil component according to claim 5, wherein each of the faces includes the first inclined portion, the second inclined portion, and the horizontal portion.

7. The coil component according to claim 3, wherein each of the faces includes the first inclined portion and the second inclined portion.

8. The coil component according to claim 6, wherein an inclination angle of the first inclined portion of at least one of the faces with respect to a straight line parallel to the axis is different from an inclination angle of the first inclined portion of an other of the faces with respect to a straight line parallel to the axis, and an inclination angle of the second inclined portion of at least one of the faces with respect to a straight line parallel to the axis is different from an inclination angle of the second inclined portion of an other of the faces with respect to a straight line parallel to the axis.

9. The coil component according to claim 1, wherein the first flange and the second flange each has an inner end face facing toward the core body; an outer end face facing away from the inner end face; a bottom face connecting the inner end face and the outer end face to each other and that is to face toward a mounting substrate on which the coil component is to be mounted; a top face facing away from the bottom face; and two lateral faces each connecting the inner end face and the outer end face to each other and connecting the bottom face and the top face to each other, the resin member covers the first flange; the second flange; the core body; and the wire on a side near the top face in a height direction defined from the bottom face of the first flange toward the top face of the first flange, and seen in a direction orthogonal to the lateral face of the first flange, a distance from a lower edge of the resin member in an area over the core body and the wire to an extension plane extended from the bottom face of the first flange is smaller on the side near the center of the core body than on the side near each of the first end and the second end of the core body.

10. The coil component according to claim 9, wherein seen in the direction orthogonal to the lateral face of the first flange, the lower edge of the resin member includes a first oblique side a distance of which from the extension plane continuously decreases from the side near the first end toward the side near the center; and a second oblique side a distance of which from the extension plane continuously decreases from the side near the second end toward the side near the center.

11. The coil component according to claim 10, wherein the peripheral face of the core body includes a bottom face that is to face toward a mounting substrate on which the coil component is to be mounted; and a top face that faces away from the bottom face, the top face of the core body includes a first inclined portion a distance of which from the axis continuously decreases from the side near the first end toward the side near the center; and a second inclined portion a distance of which from the axis continuously decreases from the side near the second end toward the side near the center, and seen in the direction orthogonal to the lateral face of the first flange, an inclination angle of the first oblique side with respect to a straight line parallel to the axis is equal to or greater than an inclination angle of the first inclined portion with respect to a straight line parallel to the axis while an inclination angle of the second oblique side with respect to a straight line parallel to the axis is equal to or greater than an inclination angle of the second inclined portion with respect to a straight line parallel to the axis.

12. The coil component according to claim 9, wherein seen in a direction orthogonal to the top face of the first flange, a width of the resin member in a direction orthogonal to the axis is smaller on the side near the center of the core body than on the side near each of the first end and the second end of the core body.

13. The coil component according to claim 1, wherein the core body has symmetry with respect to a plane extending orthogonally to the axis and passing through the center of the core body.

14. The coil component according to claim 4, wherein the at least one of the faces includes the first inclined portion, the second inclined portion, and a horizontal portion, the horizontal portion being located between and connected to the first inclined portion and the second inclined portion, and the horizontal portion being parallel to the axis, and the wire is wound by one or more turns on each of the first inclined portion and the second inclined portion and by two or more turns on the horizontal portion.

15. The coil component according to claim 4, wherein each of the faces includes the first inclined portion and the second inclined portion.

16. The coil component according to claim 7, wherein an inclination angle of the first inclined portion of at least one of the faces with respect to a straight line parallel to the axis is different from an inclination angle of the first inclined portion of an other of the faces with respect to a straight line parallel to the axis, and an inclination angle of the second inclined portion of at least one of the faces with respect to a straight line parallel to the axis is different from an inclination angle of the second inclined portion of an other of the faces with respect to a straight line parallel to the axis.

17. The coil component according to claim 2, wherein the first flange and the second flange each has an inner end face facing toward the core body; an outer end face facing away from the inner end face; a bottom face connecting the inner end face and the outer end face to each other and that is to face toward a mounting substrate on which the coil component is to be mounted; a top face facing away from the bottom face; and two lateral faces each connecting the inner end face and the outer end face to each other and connecting the bottom face and the top face to each other, the resin member covers the first flange; the second flange; the core body; and the wire on a side near the top face in a height direction defined from the bottom face of the first flange toward the top face of the first flange, and seen in a direction orthogonal to the lateral face of the first flange, a distance from a lower edge of the resin member in an area over the core body and the wire to an extension plane extended from the bottom face of the first flange is smaller on the side near the center of the core body than on the side near each of the first end and the second end of the core body.

18. The coil component according to claim 3, wherein the first flange and the second flange each has an inner end face facing toward the core body; an outer end face facing away from the inner end face; a bottom face connecting the inner end face and the outer end face to each other and that is to face toward a mounting substrate on which the coil component is to be mounted; a top face facing away from the bottom face; and two lateral faces each connecting the inner end face and the outer end face to each other and connecting the bottom face and the top face to each other, the coil resin member covers the first flange; the second flange; the core body; and the wire on a side near the top face in a height direction defined from the bottom face of the first flange toward the top face of the first flange, and seen in a direction orthogonal to the lateral face of the first flange, a distance from a lower edge of the resin member in an area over the core body and the wire to an extension plane extended from the bottom face of the first flange is smaller on the side near the center of the core body than on the side near each of the first end and the second end of the core body.

19. The coil component according to claim 10, wherein seen in a direction orthogonal to the top face of the first flange, a width of the resin member in a direction orthogonal to the axis is smaller on the side near the center of the core body than on the side near each of the first end and the second end of the core body.

20. The coil component according to claim 2, wherein the core body has symmetry with respect to a plane extending orthogonally to the axis and passing through the center of the core body.

* * * * *